United States Patent [19]
Scharnick et al.

[11] Patent Number: 5,222,009
[45] Date of Patent: Jun. 22, 1993

[54] SOLID STATE OVERLOAD RELAY

[75] Inventors: Michael R. Scharnick, Brookfield, Wis.; Gary Mayer, Sugar Grove, Ill.

[73] Assignee: Eaton Corporation, Cleveland, Ohio

[21] Appl. No.: 559,314

[22] Filed: Jul. 30, 1990

[51] Int. Cl.$^5$ .............................................. H02H 7/08
[52] U.S. Cl. ........................................ 361/28; 361/31; 318/782
[58] Field of Search ............................. 361/28, 31, 94; 318/782, 434

[56] References Cited

U.S. PATENT DOCUMENTS

| | | |
|---|---|---|
| 4,006,387 | 1/1977 | Hudak . |
| 4,241,336 | 12/1980 | Schonken . |
| 4,319,298 | 3/1982 | Davis et al. . |
| 4,354,216 | 10/1982 | Volta . |
| 4,796,142 | 1/1989 | Libert .................................. 361/23 |

FOREIGN PATENT DOCUMENTS 2103441 6/1983 United Kingdom .

OTHER PUBLICATIONS

United Kingdom Patent Office Search Report Appln. 9116471.5.
"*Instruction Manuel*", Cutler-Hammer C311 Digital Motor Protection, Eaton Corp. Publ. No. ND-333, Apr. 1989.
"*Modern Motor Protection*", R. M. Brake, Eaton Corp. Publ. No. ND-334, Feb. 1989.
"*C311 Digital Motor Protection*", Eaton Corp. Publ. No. NN-316, 1988.
Sales Brochure, Kraus & Naimer Microelectronics, IPS Intelligent Protection System, Publication No. POA056 GB K.83 American Solenoid Co., Inc. date unknown.
Catalog sheets 2/10, 2/11, 2/12, 2/13, 2/14 for the Solid State Overload Relays for Normal and Long-Acceleration Starting—Type #UB Class 10/30, Siemens, 1989.

*Primary Examiner*—Todd E. DeBoer
*Attorney, Agent, or Firm*—Andrus, Sceales, Starke & Sawall

[57] ABSTRACT

An overload control circuit and method of operation for protecting a three-phase motor from damage due to overload includes monitors reading the load on each phase of the motor and circuitry for combining the three separate phase signals into a single combined load signal which triggers the overload circuit. The gain on the combined load signal and the overload trip delay time may be calibrated and monitored by an external meter to provide for accurate and inexpensive calibration to accommodate specific operating characteristics of the motor being monitored. The circuit provides visual readouts of the mode of operation, including: (1) operating mode; (2) overload onset; (3) shut down initiated; and (4) delay to restart.

32 Claims, 9 Drawing Sheets

SOLID STATE OVERLOAD RELAY

BACKGROUND OF THE INVENTION

1. Field of the Invention

The invention relates generally to a means and method for monitoring load conditions on three-phase motors, and particularly to a means and method utilizing solid state overload control circuits for monitoring the load on each of the three phases of the motor while permitting for external calibration of the overload current gain and the trip delay sequence.

2. Description of the Prior Art

Historically, three-phase motor overload protection circuits have been designed to protect electrical motors and connected loads against potential damage caused by thermal overload and cooling problems, mechanical overload and electrical fault conditions.

In recent years, changes in electric motor design and manufacturing techniques have led to the introduction of a basic motor architecture where general purpose motor applications no longer accept a constant overload of 15-20% beyond design capacity without overheating and potentially causing thermal damage to insulation or mechanical construction. Because of these design changes, the newer motors have a faster rate of temperature rise and a much lower ability to withstand even a low level of continuous overload. These new design parameters require greater accuracy and better time/current characteristics (thermal modeling) from the protection overload circuitry.

The primary function of any overload circuitry is to provide an overload relay to switch off the motor when it begins to draw more current than the rated full load amperage (FLA). In the past, this was done by passing the motor current through a bimetallic or eutectic alloy sensing element which would heat up and trip if the current rating was exceeded. The trip point of these devices was normally plotted on what has now become a standard motor time/current trip curve. For example, if a 600% motor current was passed through an overload device, it would trip within a specific period of time. If a 400% current was passed, the overload device would trip at a different time. The actual trip time depended on the heater coils installed in the device.

The curve attempts to duplicate the thermal model of each motor in order to achieve a trip time in advance of when the motor absorbs the amount of heat required to do thermal damage to the windings. Typically, motor manufacturers assign a specific thermal rating to their motors to indicate how much heat the motor can tolerate and for how long.

While each thermal element in the thermal type overload relay could be calibrated to an individual motor, they were still affected by the external surrounding air temperature which was not always the same as the ambient temperature associated with the motor. Also, because of the difference in mass of the thermal element and the motor, the overload relay would cool down faster than the motor and subsequently be able to reset before the motor had sufficiently cooled. Successive overload trips caused by this consistency would decrease motor life.

Another problem was that motors with similar horsepower ratings, from different manufacturers, had varying thermal capacities although they met the same rating specification.

To overcome these difficulties, electric overload relays were offered as alternatives to the thermal overload device. The early attempts at direct conversion of the thermal overload to an electronic model offered only limited protection. They also introduced a number of drawbacks without providing the total economic solution.

Auxiliary voltage supplies were needed to power the electronics and, in addition, either special transducers or current transformers (CTs) were required to provide an isolated measurement signal. In addition, analog devices were not able to accurately model the motor's time/current curve (thermal model).

More recently, electronic techniques eliminating the need for an auxiliary power source and incorporating integral CTs have provided motor protection relays which are far more accurate yet easier to install than the early thermal overload relays. By using digital technology, closer thermal modeling is possible for very accurate motor protection. It is also possible to provide greater overall system protection, including in addition to overload indication, auxiliary control and access information contained within the motor and control circuit system.

An example of a currently available digital motor protection circuit is the C311 digital motor protection sytem offered by Cutler-Hammer, a division of Eaton Corporation, the assignee of the subject invention.

While digital electronic motor protection devices are becoming the norm and are recognized to provide superior motor protection by accurately modeling the time/current curve (thermal capacity) of the motor, there are several drawbacks to the digital overload protection circuits currently available. Such devices are almost cost-prohibitive on lower level applications, making their superior monitoring features unavailable in certain applications. Those inexpensive digital systems which are currently available sacrifice some of the very features which make electronic overload circuit protection desirable. For example, to achieve greater cost efficiency, less expensive digital overload protection circuits often monitor two phases of a three-phase motor, ignoring fault conditions which may be present on the other phase. In addition, many of the low-to-mid range electronic protection circuits are void of metered calibration devices, requiring the user to guess and set the overload monitoring parameters by the trial and error method.

The solid-state overload relay protection circuit of the subject invention is designed to provide a low-cost, efficient means and method for providing overload protection while preserving the features of more expensive devices now available, including the recognized improvements over either eutectic or bimetal overload relays.

SUMMARY OF THE INVENTION

The subject invention is a means and method for protecting motors against overload damage utilizing solid-state digital circuitry adapted to operate in conjunction with current transformers to monitor the load on each phase of a three-phase motor and load. Each of the phases of the motor is independently monitored and then combined through a multiplexing scheme to determine the load condition on the motor.

Once the current load on the motor is determined, a signal is generated and introduced into a microprocessor where it is compared with motor load parameters consistent with the time/current trip curve for the specific motor being monitored.

An important aspect of the invention is the ability to couple an external metering device to the gain circuit and trip delay adjustment circuits of the overload system to accurately set the overload parameters of the system consistent with the specifications of the motor.

The design of the subject invention provides for an inexpensive, yet accurate, solid-state digital overload protection circuit which is capable of being externally calibrated to accurately set protection parameters. In addition, the invention provides the means and method for monitoring each of the phases of a multiphase system in an inexpensive, dependable manner. Other features and advantages of the invention will be readily apparent from the drawings and the detailed description of the preferred embodiment which follow.

DETAILED DESCRIPTION OF THE PREFERRED EMBODIMENT

Overview of the System

Figure 1:
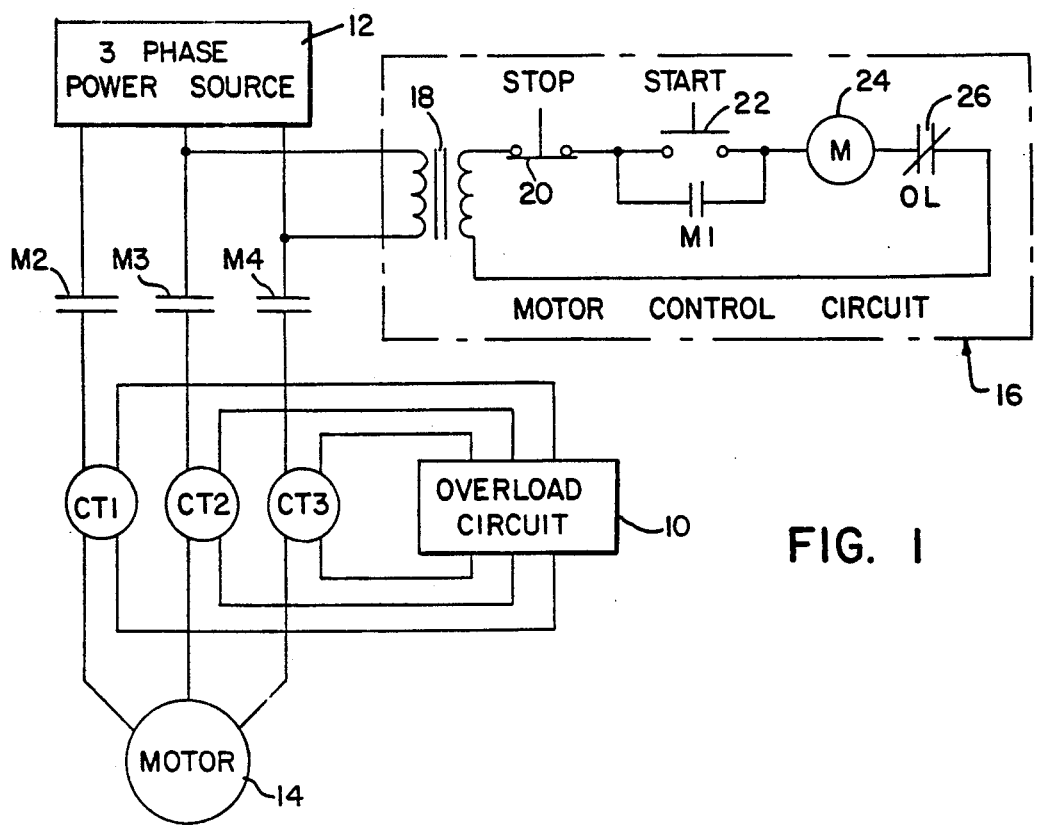
FIG. 1 is a diagram of a typical three-phase motor and motor control circuit including an overload protection circuit in accordance with the subject invention.

A power and control system for a three-phase motor and load is shown in FIG. 1. The system includes an overload protection circuit 10 incorporating the features of the present invention. A three-phase power source 12 is coupled through control contacts M2, M3 and M4 and the current transformers CT1, CT2 and CT3 to the motor 14 in typical manner. Either external or internal current transformers may be used. A single-phase start and control circuit 16 is used to control the supply of power to the motor. Generally, a step down transformer 18 is used to reduce the power from the power source (typically 208-600 volts AC) to 120 volts AC. A normally closed STOP button 20 is provided to break the circuit and manually shut off the power supply to the motor. To start up, the normally open START button 22 is closed, energizing the coil 24 and closing contacts M1, M2, M3 and M4. Contact M1 interlocks the control circuit in order that contacts M2, M3 and M4 stay energized unless the control circuit is opened at the STOP button 20 or is opened by the opening of the normally closed overload contacts 26.

The overload circuit 10 of the present invention is connected to the secondaries of the three current transformers CT1, CT2 and CT3 for monitoring the load current to detect the presence of an overload condition. When a predetermined overload condition is present, the overload circuit 10 is activated to open contacts 26 and shut down the power supply to the motor 14. After certain events have occurred, the contacts 26 will reclose to permit starting the motor. The overload circuit of the present invention incorporates a multiplexing scheme which permits monitoring each of the three power phases. Use of the multiplexer permits continuous sequential scanning of the load on each phase. The gain on the output of the multiplexer is adjustable to permit use of the overload circuit with a plurality of motor sizes.

Figure 2:
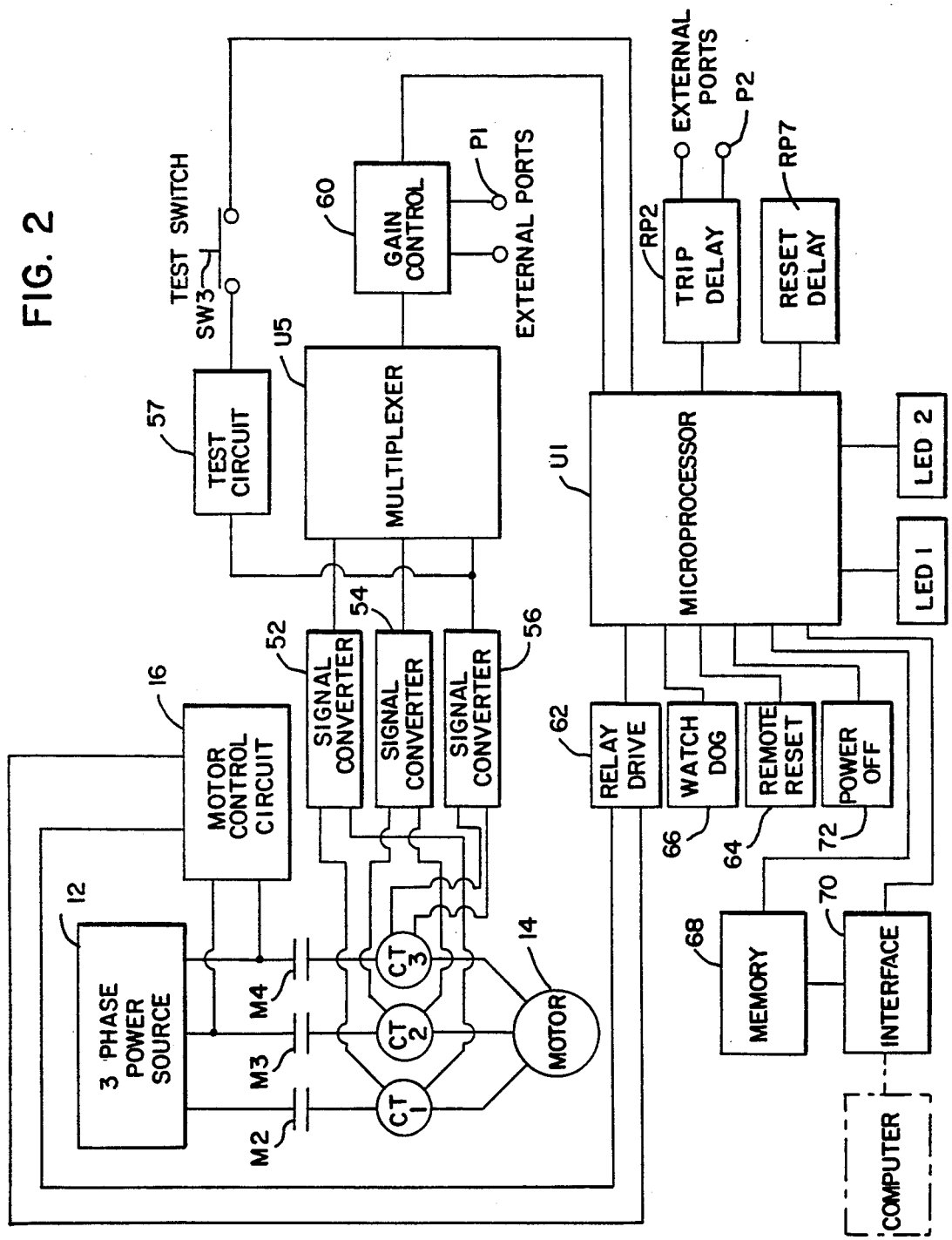
FIG. 2 is a functional block diagram of the overload protection circuit of FIG. 1.

An expanded functional block diagram of the overload control circuit is shown in FIG. 2. As there shown, a signal converter 52, 54 and 56 is provided and coupled to each of the current transformers CT1, CT2 and CT3, respectively. The converters convert the current at each phase of the motor into a filtered d.c. signal for input to the multiplexer U5. The multiplexer U5 continuously sequentially scans the outputs of the converter circuits to monitor the load level on each of the three phases of the motor windings. The three monitored signals produced by the converter circuits 52, 54, 56 are input to the multiplexer where they are combined to produce a single output which preserves the independent identity of each of the three inputs. This combined signal is input to a gain control circuit 60 where the current gain range can be set in accordance with the load specifications for each particular motor 14. An important aspect of the invention is the ability to attach a digital volt meter to the external ports P1 of the gain control network 60 in order to externally read the gain set by the adjustable gain control circuit. This provides an inexpensive yet accurate way to select and control the gain on the overload circuit.

The output of the gain control network is introduced into the microprocessor U1. When the output of the gain control exceeds the overload condition, the microprocessor senses this and initiates an overload trip subroutine. The trip delay circuit RP2 controls the activation of the trip signal, requiring that the overload condition be present for a specified period of time before the trip signal is activated. The trip delay circuit also provides for the attachment of an external meter to ports P2 to determine the trip delay range. This permits accurate yet inexpensive setting of the delay in accordance with the motor specifications and operating parameters.

If the overload condition is present for the defined period of time, the trip sequence is initiated, and a trip signal is output by the microprocessor to the relay drive circuit 62. The relay drive circuit is coupled directly to the overload contacts 26 (FIG. 1). When the trip signal is present, the normally closed contacts 26 are opened and the motor is shut down.

The reset delay circuit RP7 controls the period of time during which the motor control circuit cannot be reactivated after shutdown to start motor 14. The reset delay circuit is adjustable from a minimum time of five minutes to a maximum time of 120 minutes, as specified by the motor manufacturer. The actual reset time is dependent on this setting, the trip/time curve, and the previous load conditions (thermal memory data).

Readouts are provided at LED1 and LED2 to identify at all times what mode the overload circuit is in, e.g., ready, fault detected, trip routine initiated, and delay cycle initiated.

A test circuit 57 is coupled to one of the outputs of the signal converters (as shown, the phase three signal converter 56) to provide a simulated overload condition for testing the operability of the overload circuit when the motor 14 is de-energized and no current is flowing through current transformers CT1, CT2 and CT3. When the test switch SW3 is closed, the test circuit provides to the multiplexer U5 a test voltage sufficient to signal an overload and provide a trip condition output from the gain control circuit 60 to the microprocessor U1. This initiates the trip condition subroutine in the microprocessor to test the operability and time period of the trip delay and the reset delay circuits RP2 and RP7, respectively. The relay drive 62 responds to the test circuit in the same manner as it would to an actual overload condition. Once the test overload reaches the reset delay stage, the test sequence is completed and the system can either be manually or automatically reset, depending on the option shown.

The watch dog circuit 66 provides two functions. First, it contains the power-on/reset sequence that allows the microprocessor to initialize prior to operation. This is a time delay sequence initiated after the power supply to the microprocessor U1 is turned on, wherein the microprocessor is permitted sufficient time to go through its intialization sequence prior to being powered up and operational. In addition, once the microprocessor is operational, the watch dog circuit monitors an output signal from the microprocessors to make certain the software code is being properly executed.

An optional remote reset circuit 64 is provided to allow the user to reset the system upon completion of an overload detection, trip and delay sequence by supplying a 120 VAC signal. The reset circuit is isolated from the overload circuit by an optical coupler, which is further described in the detailed description of the circuit herein.

An optional memory circuit 68 is provided in conjunction with the optional computer interface circuit 70. The optional interface circuit 70 is a standard computer interface such as, by way of example, the Cutler-Hammer E-Link RS485 computer interface presently available from the assignee of the subject invention. The computer interface permits the overload circuit to be coupled to a computer control system. This permits entry by the computer of the various conditions and parameters to be monitored and allows for automatically setting the programmable features of the microprocessor via computer control.

An optional power-off circuit 72 is also illustrated. This feature monitors the condition of the overload relay system just prior to a power loss. For example, if the power supply to the microprocessor is cut off, the optional power off circuit will detect whether the shut down occurred during normal operating conditions or during an overload sequence. In the event that the shut down occurred during normal operating procedures, upon restoration of power to the microprocessor the power-off circuit will signal to the microprocessor that an overload condition was not present at the time of shut down. This will eliminate the motor energization delay sequence. In the event that the shut down occurred during an overload condition, upon restoration of power to the microprocessor the power-off circuit will signal that the shut down occurred during overload. In this case, the delay sequence will be activated before the motor can be energized.

Detailed Description of the Circuit

FIGS. 3–10 are a detailed circuit diagram of the overload circuit 10 illustrated in FIGS. 1 and 2. Standard engineering nomenclature and symbols are used. Throughout the circuitry in FIGS. 3–10, the pin designations of the manufacturers are consistently used. For clarity, some of the signal lines have been "bundled" to simplify the drawing. Specifically, lines h1–h4, i1–i8, k1–k5 and cc1–cc4 are shown as bundled in FIG. 6. Each reference numeral in each of these bundles represents a separate and distinct signal line in the drawing, e.g. h1 is always separate and distinct from h2, and so on.

1. Power Supply

Figure 3:
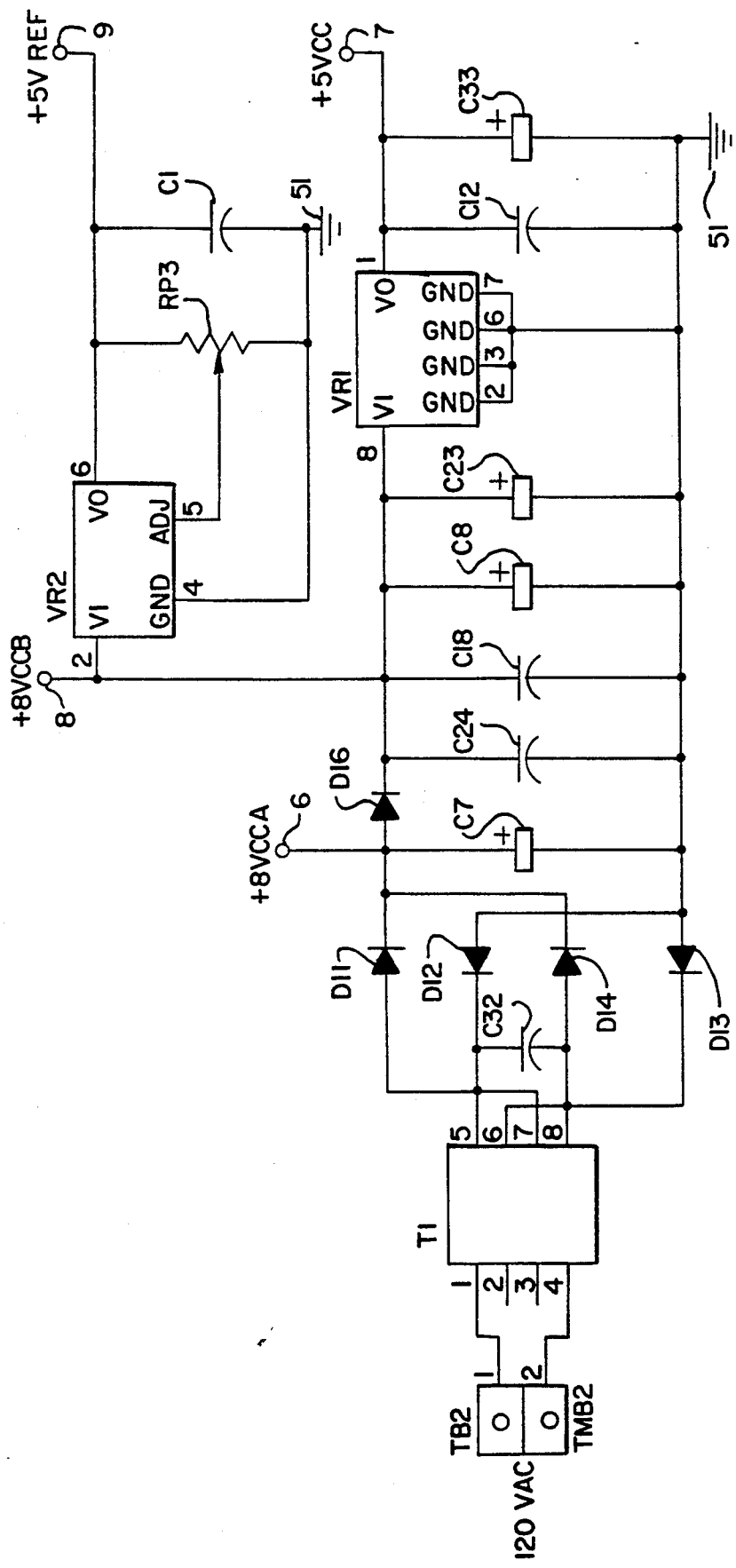

Turning now to FIG. 3, the overload circuit of FIGS. 1 and 2 is driven by the power supply circuit there shown. The power supply utilizes the 120 volt AC power available from two lines of typical three-phase power supply 12, as connected at terminals TB2 and TMB2. At the option of the user, an external 120 VAC power supply can also be used. A step down transformer T1 reduces the 120 volt source to 8 volts rms. In the drawing, the transformer T1 is an ST3/SPW402 transformer manufactured by Permagnetics. The diode bridge defined by diodes D11, D12, D13 and D14 produces a full wave rectified 8 volt d.c. voltage partially filtered by electrolytic capacitor C7. The ceramic or polyester capacitors C1, C12, C18, C24 and C32 are for noise suppression. The 8 volt d.c. signal at node 6 has substantial ripple which is used for non-critical components such as the indicators LED1 and LED2 and the relay drive 62. Wherever this source is used, it is designated by 8VCCA. This voltage is filtered further by the electrolytic capacitors C8 and C23 to provide a smooth clean 8 volt d.c. signal at node 8, which is used by critical components. Whenever this source is used, it is designated by 8VCCB. Diode D16 is present to isolate the 8VCCA source from the 8VCCB source. Voltage regulator VR1 (LM78L05ACM, National Semiconductor) provides a constant clean 5 volt d.c. signal designated 5VCC at node 7. Capacitor C33 provides filtering when current surges occur. The voltage regulator VR2 (REF02HCSA, Raytheon) and calibrating potentiometer RP3 provide a calibrated 5 volt d.c. reference voltage (tolerance within 1%) 5VREF at node 9. RP3 provides feedback for VR2 to maintain 5 volts d.c.

Also as noted in the remaining drawings, the 8VCCA signal is monitored for shutdown since the signal is less filtered than the 8VCCB or either 5 volt signals and, therefore, 8VCCA will drop out faster than the others which are dependent upon discharge of the various capacitors.

Node 51 is the system ground node to which all the grounds are tied. Ground nodes and associated terminal tie-ins are represented by standard symbols and for purposes of this description are common throughout the circuit.

2. Signal Converters

Figure 4:
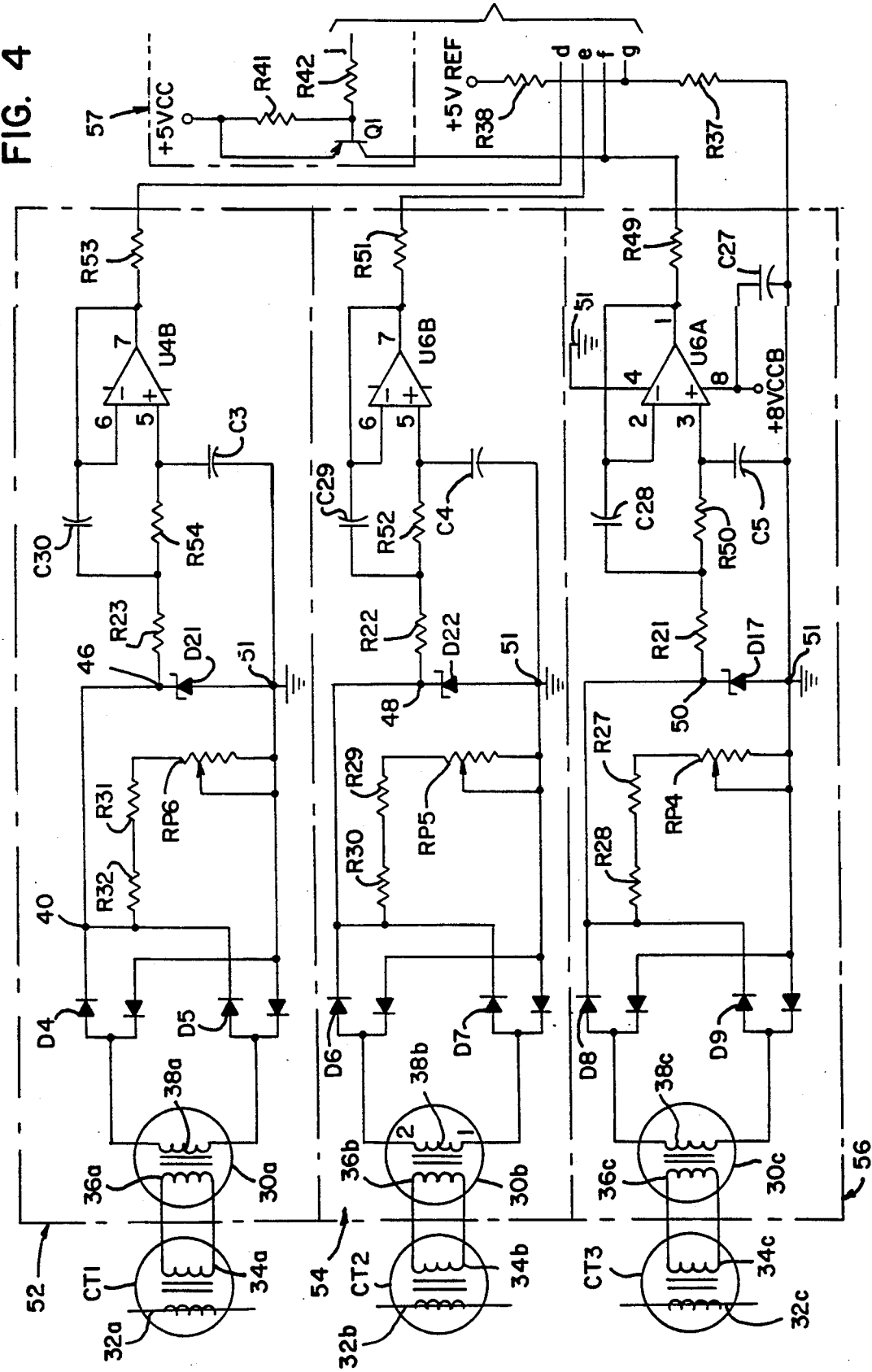

As shown in FIGS. 1 and 2, the overload circuit 10 is connected across the output coil of each current transformer CT1, CT2, and CT3. Referring now to FIG. 4, in the preferred embodiment, internal current transformers 30a, 30b, 30c are included for each phase. The primary 32a, 32b, 32c of each current transformer CT1, CT2, CT3 is the respective line from motor 14 and is, of course, connected directly to one phase of the power source 12 through the contacts M2, M3 or M4 (FIGS. 1 and 2). The secondary windings 34a, 34b, 34c are passed through the respective internal current transformers 30a, 30b, 30c and define the primary windings 36a, 36b, 36c thereof. Each signal converter 52, 54 and 56 of the overload circuit 10 is connected across the secondary winding 38a, 38b, 38c of the respective current transformer 30a, 30b, 30c.

In order to understand the operation of this section of the circuit, it will only be necessary to describe a signal converter connected with one phase, as the remaining two phases operate in identical manner. Using converter 52, the secondary winding 38a is connected across a standard BAV99 diode bridge D4, D5 to produce a full wave rectified voltage at node 40. An adjustable potentiometer RP6, with resistors R31 and R32, is connected at node 40 in parallel with the diode bridge to create a burden for the current transformer 30a to produce a voltage signal which can be adjusted to match the signals from the other current transformers 30b, 30c. Voltage output is then limited through the MMBZ5240B Zener diode D21 to provide a 10 volt d.c. maximum voltage at node 46. Resistors R23 and R54, capacitors C30 and C3, and the TLC27M7CD operational amplifier U4B define a two-stage low pass filter for current transformer 30a. This filter configuration has a center operating frequency of approximately 100 Hz. The remaining converter circuits 54, 56 are comparable to the above-described converter circuit 52, with components D6, D7, R30, R29, RP5, D22, R22, R52, C29, C4, U6B, R51 comparable respectively to D8, D9, R28, R27, RP4, D17, R21, R50, C28, C5, U6A, R49, which are comparable respectively to D4, D5, R32, R31, RP6, D21, R23, R54, C30, C3, U4B, R53.

Thus, as shown, the respective voltage output of the three current transformers CT1, CT2 and CT3 is present at nodes 46, 48 and 50. All are referenced to ground at node 51. The low pass filters for current transformers CT2 and CT3 include the TLC27M7CD operational amplifiers U6B and U6A, respectively. The filtered output of the amplifiers U4B, U6B and U6A are introduced into the multiplexer circuit U5 (FIG. 5) through the respective current limiting resistors R53, R51 and R49 and via lines d, e, and f, respectively. The capacitor C27 is for noise suppression.

3. Multiplexer

Figure 5:
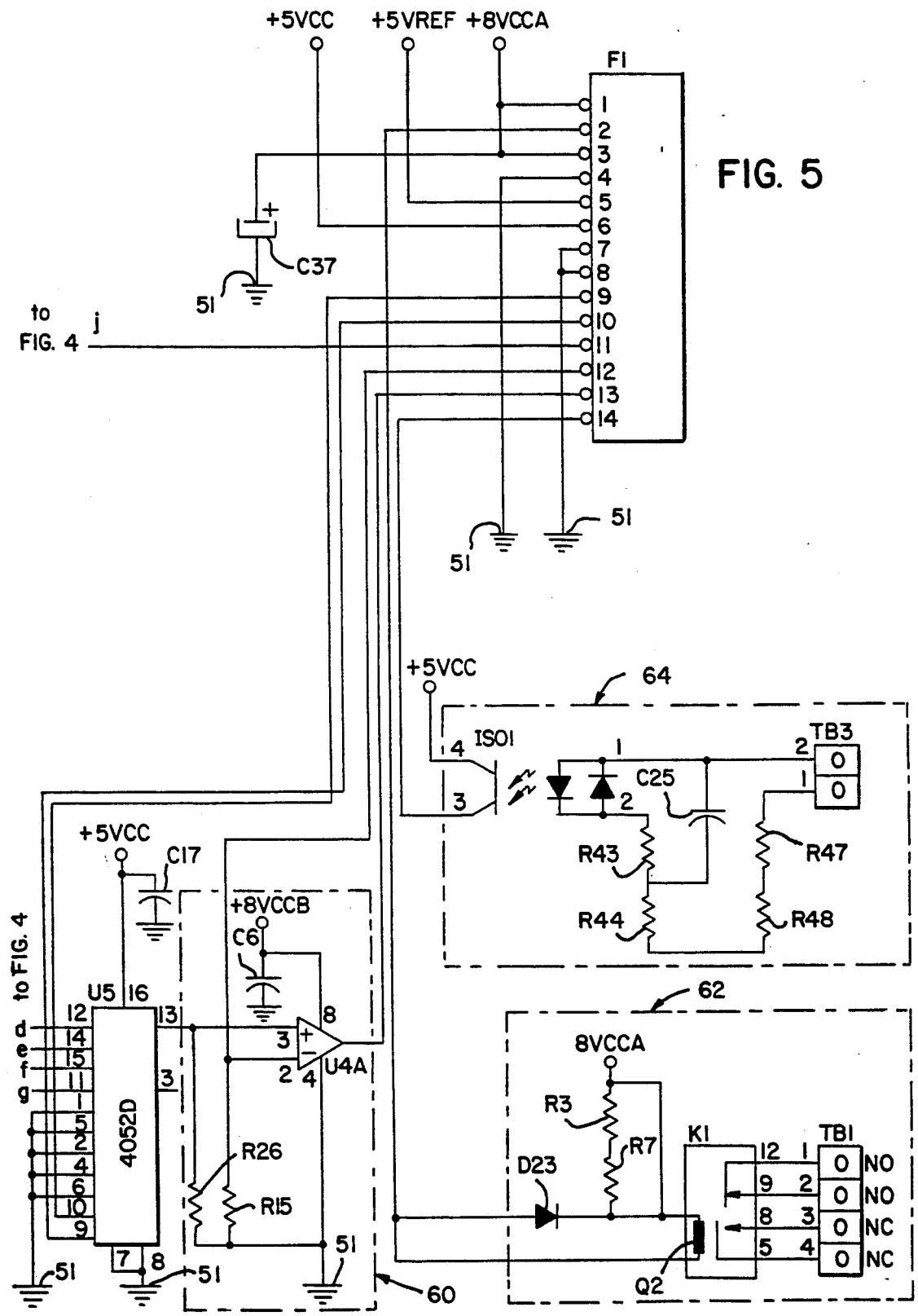

As shown in FIG. 5, the 4052D multiplexer U5 manufactured by National Semiconductor is a dual, four-channel, two-output circuit. The two outputs are at pins 3 and 13 and the inputs are at pins 1, 2, 4, 5, 6, 11, 12, 14 and 15. The outputs of amplifiers U4B, U6B and U6A are introduced into the multiplexer U5 at pins 12, 14 and 15 via lines d, e, and f. The reference voltage is tied to the fourth input pin 11. The reference voltage is generated by using the voltage divider created by the resistor R37 and the resistor R38 (FIG. 4). This provides a gain adjustment reference signal for the outputs from the amplifiers U4B, U6B and U6A. For present purposes, only one output of the multiplexer is required and this is taken at pin 13. Also, the remaining inputs on pins 1, 2, 4, 5 and 6 are rendered inert by shunting to ground.

The output of the multiplexer at pin 13 is directly related to the instantaneous voltage level read on the continuously scanned inputs from lines d, e, and f at respective pins 12, 14, and 15 of the multiplexer. By continuously scanning the inputs, using the 4052D multiplexer shown, approximately 10 readings or samples per input are taken every 16 milliseconds. These readings are combined and are outputted on pin 13. As is typical, the multiplexer output is serial in nature. Thus, the identity of each input is preserved, though combined into a single output. By way of example, samples 1, 4, 7, 10 . . . represent the input on pin 12. Samples 2, 5, 8, 11 . . . represent the input on pin 14. Samples 3, 6, 9, 12 . . . represent the input on pin 15. In this manner, the distinct identity of the three independent signals is preserved in the combined signal. This gives a very accurate picture of the current load on motor 14 and provides for accurate and efficient monitoring by the overload circuit. Capacitor C17 is for noise suppression.

4. Gain Control

Figure 6:
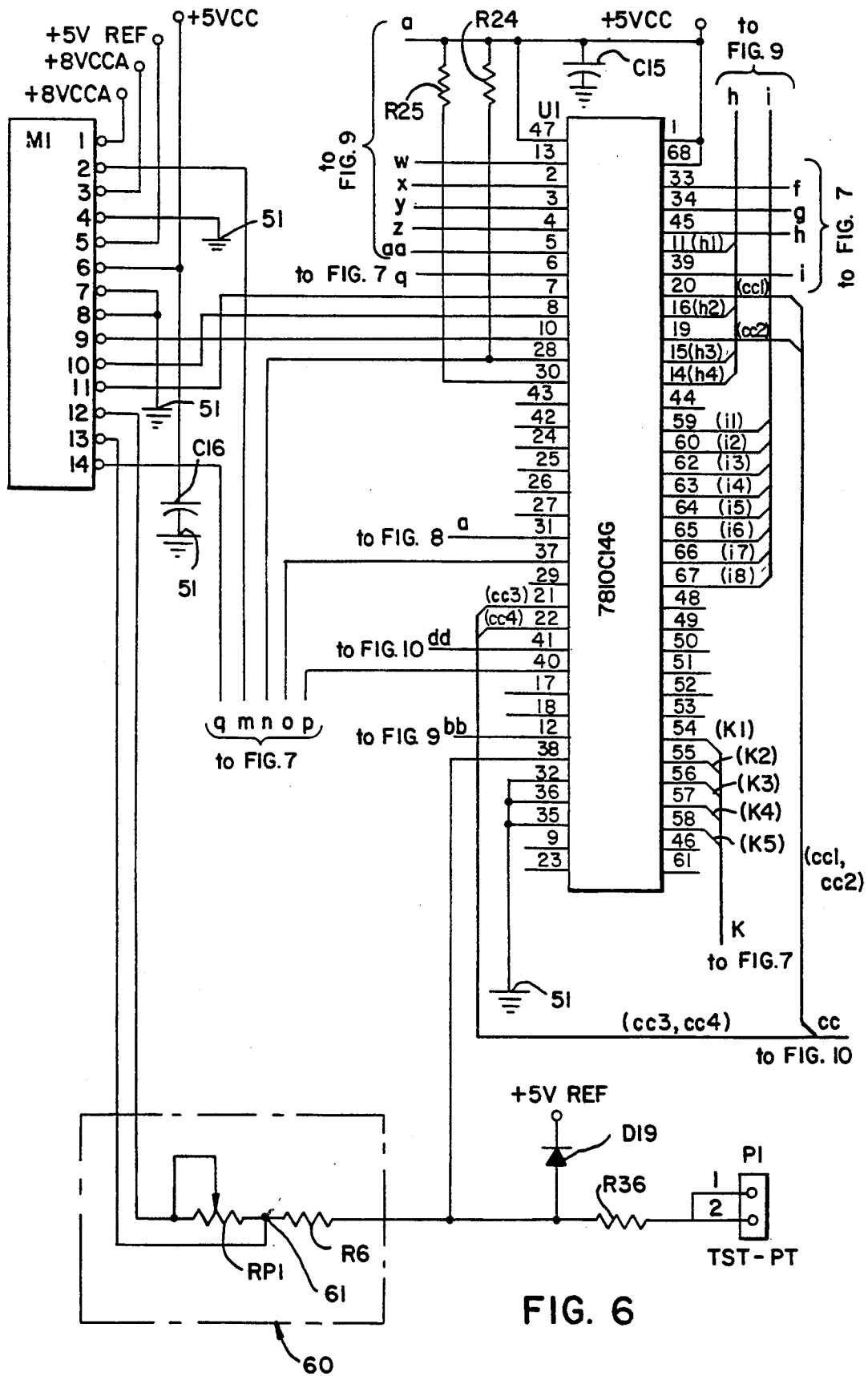

The output on pin 13 of the multiplexer is tied to the gain control circuit 60 (FIG. 5) at pin 3 of the TLC27MCD operational amplifier U4A. The 1M ohm resistor 26 provides a ground reference for the multiplexer output signal which is then introduced to the input pin 3 of the amplifier U4A. Output pin 1 of amplifier U4A is tied to pin 13 of the connector F1. This is mated with pin 13 of the mated connector M1 (FIG. 6. Note, all pins on connectors F1 and M1 correspond). The pin 2 input of the amplifier U4A is tied to the 10K ohm adjustable potentiometer RP1 (also FIG. 6) through pins 12 of the connectors M1 and F1. The 1K ohm resistor R6 provides current limiting through diode D19 to protect the microprocessor U1 (FIG. 6). The output on pin 1 of the amplifier U4A is tied to node 61 (FIG. 6) between the resistor R6 and the potentiometer RP1 via pins 13 of the connector F1 and M1. This provides for adjustment of the gain on the amplifier U4A based on the voltage reference introduced at pin 11 of the multiplexer U5 (as herein described). As shown, the 5VREF reference voltage is divided by the resistor divider network R38 and R37. In the preferred embodiment, this network supplies approximately 0.45 volts. The amplifier U4A is designed to permit a gain of from 1 to 6, or an output of about ⅓ volt to about 3 volts in the FLA adjustment mode.

The potentiometer RP1 (at node 61) is tied to pins 1 and 2 of the amplifier U4A through pins 13 and 12 of the connectors M1 and F1. The output signal present at node 61 is current limited by the 1K ohm resistor R6 and is tied to the microprocessor at pin 38. Pins P1 (FIG. 6) provide a test point where the digital volt meter can be inserted into the circuit in order to set the operational amplifier gain. Resistor R36 is present to prevent loading the amplifier U4A when the meter is connected to pin P1. Resistor R15 (FIG. 5) is a current limiting device. Capacitor C6 (FIG. 5) is for noise suppression.

5. Relay Circuit

Figure 7:
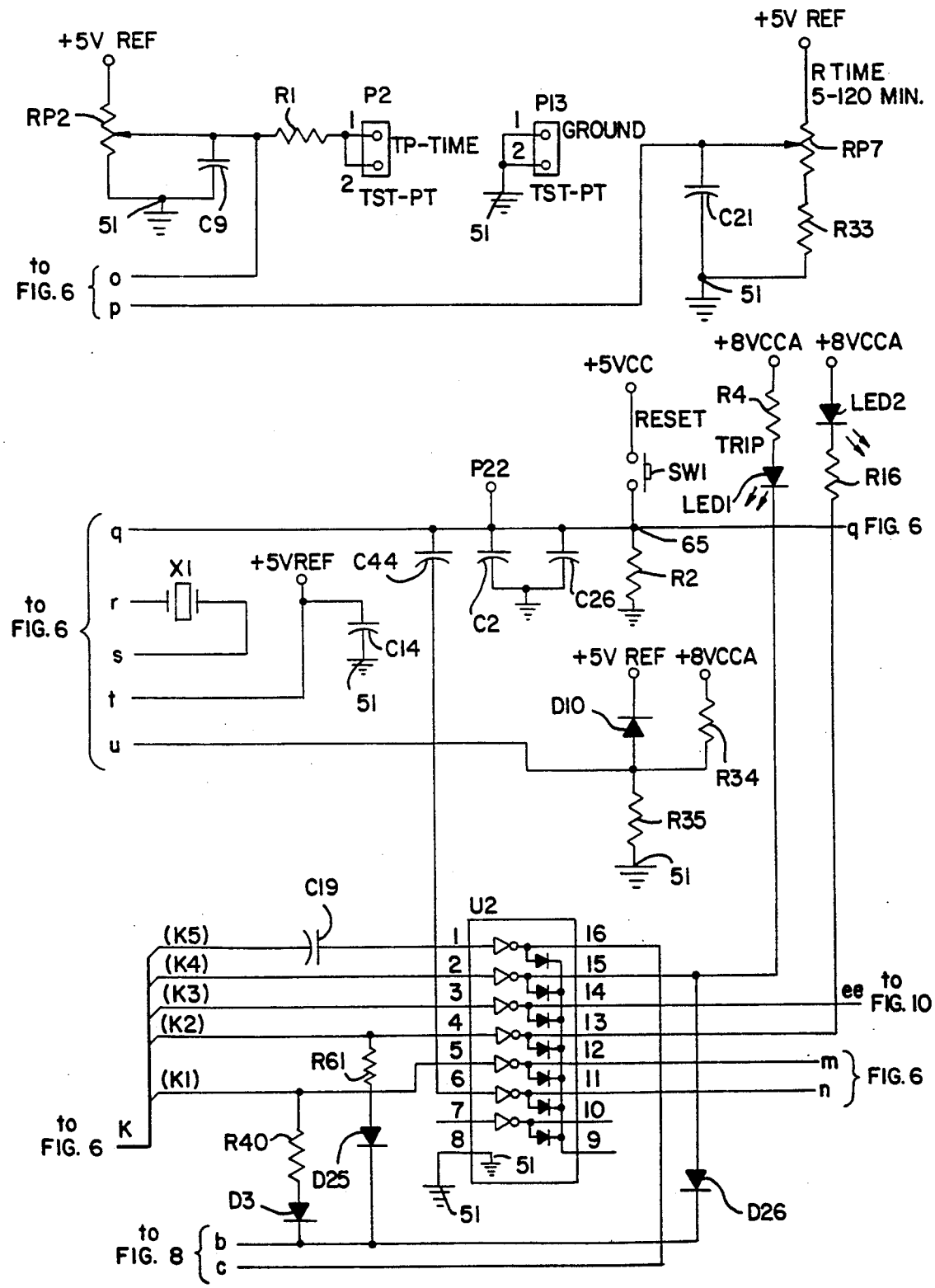

Turning now to the relay circuit 62 (FIG. 5), the MMBD914 diode D23 is a free wheeling diode to protect the drive circuit U2 (FIG. 7). This assures that when the relay K1 is turned off, there is a current flow path so the voltage at pin 16 of relay K1 does not go above the voltage rating of driver U2, preventing blowing of the relay drive transistors. Resistors R3 and R7 (FIG. 5) drop the eight-volt power supply voltage 8VCCA to five volts to drive the relay circuit. It will be understood that the choice of relay is arbitrary and the power supply for the relay will be consistent with the requirements for the relay selected. Pins 5, 8, 9 and 12 of the relay K1 are connected to the relay contacts such as overload contacts 26 (FIG. 1) through terminal block TB1. The relay pin 1 is tied to pin 12 of the driver U2 through pins 2 of the connectors M1 and F1 and line M. Pin 16 of the relay K1 is tied to pin 54 of the microprocessor U1 (FIG. 6) via pins 12 and 5 of driver U2 (FIG. 7) and line K1. The relay circuit 62 is energized by the output from microprocessor pin 54.

Specifically, when the relay transistor Q2 is turned ON, the signal at pin 16 of the relay K1 is pulled LOW. This closes the circuit between pins 5 and 8 of the relay K1 to close the overload contacts 26 connected to terminal block TB1 of the relay K1. Similarly, the circuit between pins 9 and 12 of the relay K1 is opened to open the associated contacts at the terminal block TB1. When the microprocessor outputs a signal at pin 54 (FIG. 6) and thereby to pin 16 of the relay K1 (FIG. 5), this signals an overload trip condition. Pin 54 goes LOW, driving pin 16 of the relay K1 LOW to de-energize the relay, reversing the state of the contacts to shut down the motor 14 by opening up the start and control circuit 16. In the illustrated embodiment, the contacts tied to pins 8 and 5 correspond to the overload contact 26 of FIG. 1. The remaining contacts tied to pins 9 and 12 are generally reserved for alarm signals and the like.

6. Watch Dog Circuit

Figure 8:
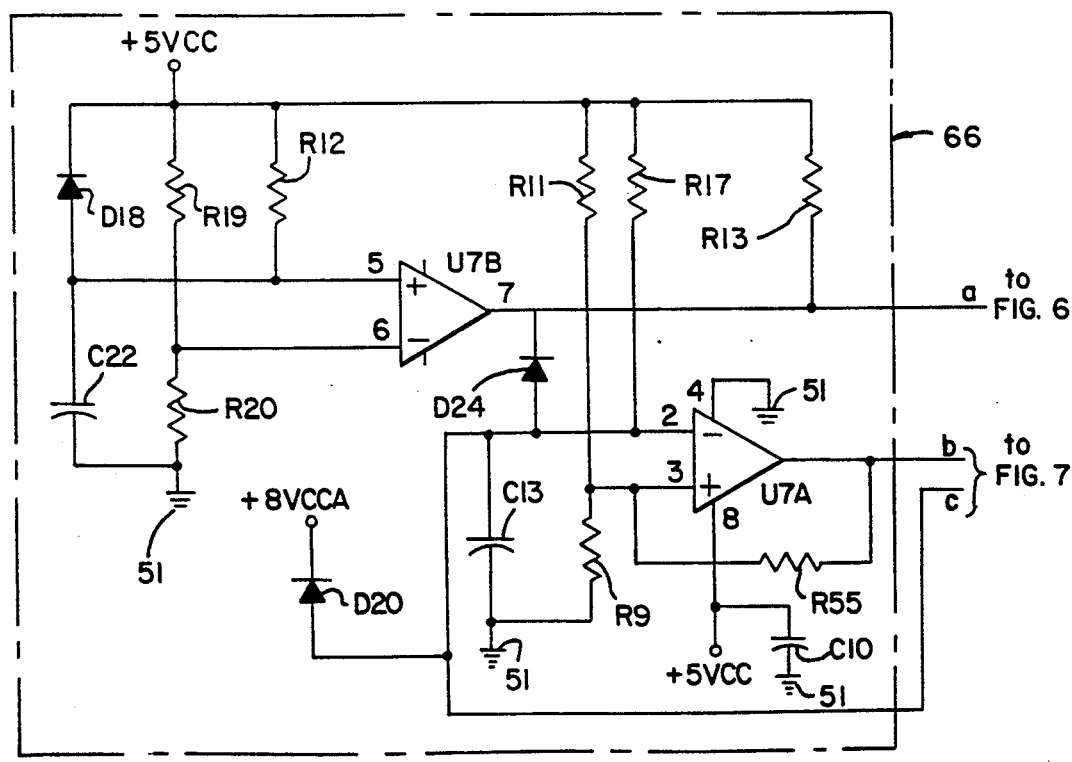
FIGS. 3-10 are a detailed circuit diagram of the overload protection circuit illustrated in FIGS. 1 and 2.

The watch dog circuit 66 is shown in FIG. 8. This circuit provides two distinct functions. The first is a power-on reset function defined by the LM939D comparator U7B and the RC network R19, R20, R12, C22 and the MM3D914 diode D18. Resistor R19 is 10K ohm, R12 is 750K ohm and R20 is 33.2K ohms. The output pin 7 of the comparator U7B is tied directly to the reset pin 31 of the microprocessor U1 (FIG. 6) via line a. In normal operation, the five volt supply voltage 5VCC is applied to the voltage divider circuit R19 and R20, and from the voltage divider to pin 6 of the comparator U7B. Ramping up or charging is also provided on pin 5 through the RC network consisting of resistor R12 and capacitor C22. As the capacitor C22 charges up, the voltage slowly rises on pin 5. When pin 5 goes higher than pin 6, the output of pin 7 goes HIGH and the microprocessor is in the operating mode. The delay provided by RC circuit R12, C22 permits the microprocessor to complete its initialization cycle once it is powered up. The power on reset circuit time delay assures that the microprocessor has time to reset before it is in the operating mode.

As long as the output on pin 7 is LOW, i.e., before reset, the diode D24 holds the signal at pin 2 of comparator U7A down as well. While pin 2 is LOW, the charge up of capacitor C13 is prevented. This keeps the output pin 1 of comparator U7A HIGH, because the voltage on pin 2 is lower than the voltage on pin 3 as produced by the voltage divider network R11 and R9. When the output on pin 7 goes HIGH, capacitor C13 is charged up by the 8VCCA supplied through diode D20 and is tied to pin 3 of amplifier U7A through resistor R9. Diode D20 prevents the supply voltage from exceeding 8 volts. When the charge on capacitor C13 exceeds the level on pin 3 of comparator U7A, pin 1 of comparator U7A goes LOW. This pulls the MMBD914 diode D3 (FIG. 7) to ground via line b. This drives the signal on diode D3 from pin 5 of the driver chip U2 through the current limiting resistor R40, rendering the driver output at pin 12 operative. The driver circuit in the illustrated embodiment is an MC1413D driver manufactured by Motorola. The output of pin 12 of the driver U2 is tied to pins 1 and 16 of relay circuit K1 through pins 2 of connectors M1 and F1 (FIGS. 5 and 6). When a fault condition occurs, pin 54 of the microprocessor U1 (FIG. 6) goes LOW, as will be explained. This pulls pin 5 of driver U2 LOW, and this is output at pin 12 of the driver U2, de-energizing the relay transistor Q2 at pins 1, 16 of the relay circuit K1 (through pins 2 of connectors M1 and F1) to reverse the state of the relays.

Capacitor C10 (FIG. 8) is for noise suppression. Resistor R17 is a current limiter for delaying the charge up of capacitor C13. Resistor R13 is a pull-up resistor to pull up pin 7 of comparator U7B to a full 5 volts when HIGH. Resistor R55 is a feedback resistor for hysteresis.

The output of the comparator U7A on line b (FIG. 8) is also tied to diode D25 (FIG. 7). Pin 4 of driver U2 is pulled LOW through resistor R61 for current limiting when pin 1 of the comparator U7A is LOW. This causes pin 13 of driver U2 to go HIGH and de-energizes the green system ready light LED2 (FIG. 7) which is connected to pin 13 of the driver U2 through the current limiting resistor R16. At the same time, when pin 1 of comparator U7A is LOW, the red LED1 (FIG. 7) is energized through the current limiting resistor R4 and diode D26.

The second function of the watch dog circuit 66 is the watch dog function. To provide this function, the input to pin 1 of driver U2 (FIG. 7) is taken from microprocessor pin 58 (FIG. 6) through the capacitor C19 via line k5 (FIG. 7). The capacitor C19 is present to smooth out any spike due to the transition of the microprocessor from a disabled state to a ready state, preventing the spike from being applied to pin 1 of driver U2, thereby preventing a false input signal to the watch dog circuit if the microprocessor is stuck HIGH. The corresponding output signal on pin 16 of the driver U2 (FIG. 7) is fed on line c (FIG. 7 to FIG. 8) back to pin 2 of comparator U7A. This keeps the signal on line c LOW and keeps from charging capacitor C13, holding the comparator U7A output signal on pin 1 HIGH.

Thus, once the microprocessor U1 (FIG. 6) is in the operating state and pin 7 of comparator U7B goes HIGH, the system continues in an operating mode as long as the microprocessor produces an output signal at pin 58. This keeps pin 16 of driver U2 LOW and a LOW signal on line c, which keeps capacitor C13 (FIG. 8) from charging. This maintains the output on pin 1 of the comparator U7A HIGH. When a malfunction or fault occurs at the microprocessor, altering the output on pin 58, the watch dog circuit is operative to shut down the system. This occurs because pin 1 of the comparator U7A (FIG. 8) goes LOW, pulling pin 5 of driver U2 LOW through diode D3 and resistor R40. This changes the state of the signal on pin 12 of the driver U2 and since this is tied to pins 1 and 16 of the relay K1 (FIG. 5), the relay transistor Q2 is operative to deactivate the contacts.

As shown, the output pin 1 of the comparator U7A (FIG. 8) is also connected via line b directly to the red light emitting diode LED1 (FIG. 7) through diode D26. Whenever the output on pin 1 of comparator U7A goes LOW, the light emitting diode LED1 is energized.

As stated, the output on pin 13 of driver U2 (FIG. 7) is directly connected to the green system ready light emitting diode LED2 (FIG. 7). Whenever the signal on pin 13 goes LOW, this light is energized. As described, this occurs whenever the input to pin 4 of driver U2 is HIGH, which occurs whenever the output on pin 1 of comparator U7A (FIG. 8) is HIGH and the diode D25, through resistor R61, is operative to pull pin 4 of driver U2 LOW.

7. Test Circuit

The test circuit 57 is shown in FIG. 4. As there shown, the pin 1 output of signal converter amplifier U6A is tied to the collector of the MMBT3906 PNP transistor Q1 through resistor R49. The driver of transistor Q1 is tied to pin 7 of the microprocessor U1 (FIG. 6) via line s, through resistor R42 and pins 11 of connectors M1 and F1. Test switch SW3 (FIG. 9) is tied to pin 5 of the microprocessor U1 (FIG. 6) via line aa. Test switch SW3 (FIG. 9) is normally open and includes the antibouncing capacitor C31 (FIG. 9) to eliminate sporadic signals. The resistor R14 is normally tied to ground to keep microprocessor pin 5 LOW. When the test button SW3 is depressed and closed, pin 5 goes HIGH and the microprocessor test routine is activated. This generates a flashing signal at pin 57 of the microprocessor U1, which is sent to pin 2 of driver U2 (FIG. 7) via line K4, activating pin 15 of the driver U2, whereby the red LED1 starts flashing.

Resistor R41 (FIG. 4) is used to keep transistor Q1 OFF until pin 7 of the microprocessor U1 goes LOW. Resistor R42 provides current limiting on pin 7 of the microprocessor. When pin 7 of the microprocessor goes LOW, transistor Q1 is turned on to supply the 5 volts from the test circuit 57 to pin 11 of the multiplexer (FIG. 5), via line f, for simulating an overload condition.

Also, at this time, the subroutine drives pins 10 and 8 of the microprocessor U1 (FIG. 6) HIGH. These signals are transmitted to pins 9 and 10 of the multiplexer (FIG. 5) through pins 9 and 10 of the connectors M1, F1. This signals the multiplexer to monitor pin 11 and generate the pin 11 signal as output on the multiplexer pin 13.

After a programmed delay, pin 57 of the microprocessor U1 (FIG. 6) goes steady HIGH and the light LED1 (FIG. 7) turns steady red, signaling an overload trip condition. At this time, the signal on pin 55 of the microprocessor oscillates HIGH and LOW, and this signal is sent via line k2 to driver U2, pin 4, activating driver pin 13 to cause the green LED2 (FIG. 7) to start flashing, indicating that the microprocessor U1 is calculating when reset will be operational. At that point, the subroutine is complete, the system is reset and the test sequence is complete.

8. Trip Delay Circuit

The delay circuit is shown in FIG. 7 and includes the 10k potentiometer RP2 which is tied to the microprocessor U1 (FIG. 6) at pin 37 via line o and is used to set the trip delay time (or overload class). Open pins P2 and P13 permit external monitoring of the trip time. This permits the user to read the voltage drop across the line and adjust it by adjusting the potentiometer RP2 to accommodate the time/trip curve for each particular motor. Capacitor C9 is for noise suppression. Resistor R1 is provided for current limiting when the meter is attached to pins P2, P13.

9. Reset Time Circuit

Reset time circuit is illustrated in FIG. 7 and includes the 10K potentiometer RP7 which is tied to pin 40 of the microprocessor U1 (FIG. 6) via line p. The resistor R33 sets the lower boundary of the reset time to five minutes, so that the reset delay cannot be inadvertently set to zero. Capacitor C21 is for noise suppression.

10. The Microprocessor

Figure 9:
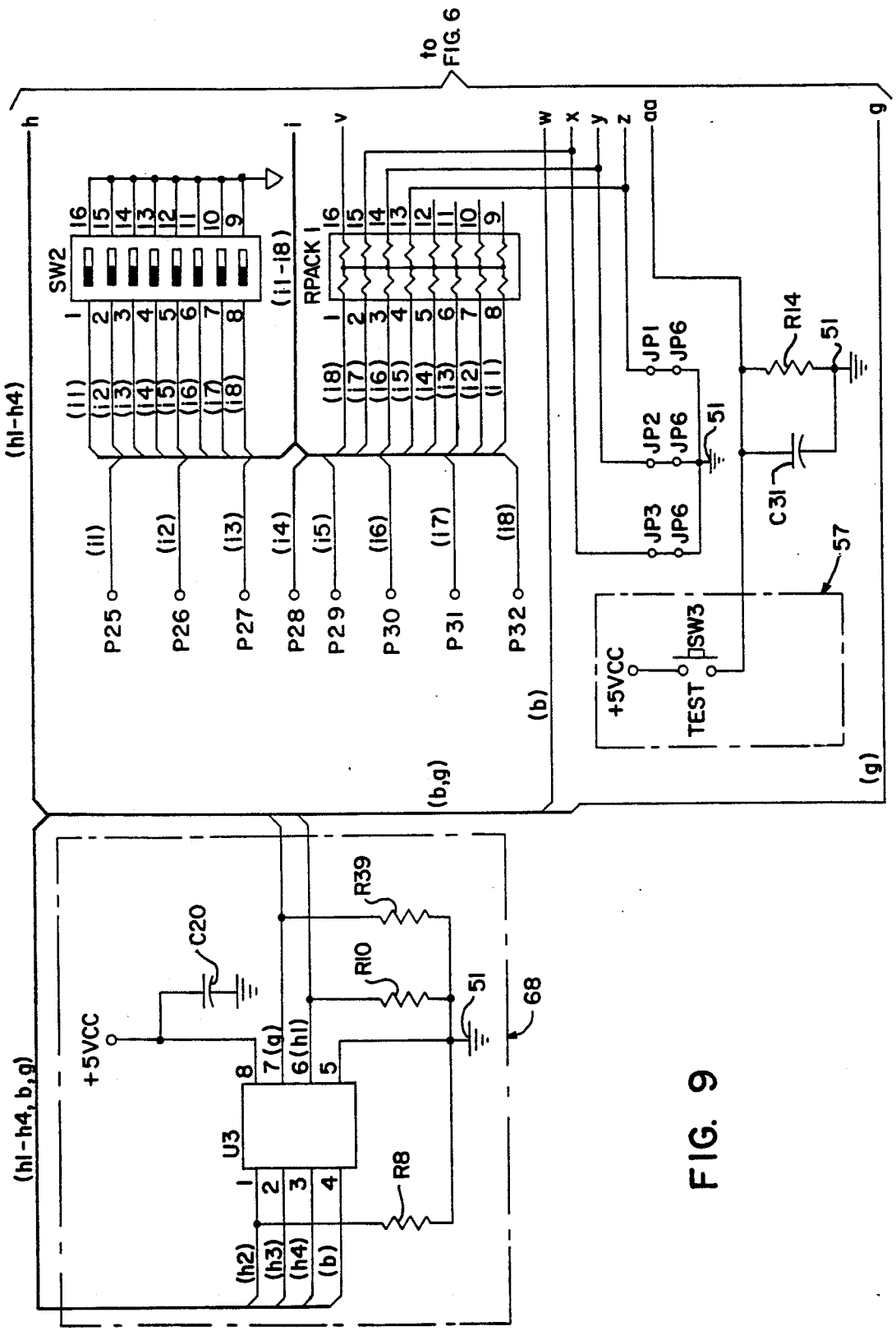

The 7810C14G or masked microprocessor U1 manufactured by NEC Electronics is shown in FIG. 6. As used in the preferred embodiment, it includes the dip switch programming shown in FIG. 9 to provide enhanced product protection. This is achieved by cutting small open points or traces in the signal paths in the circuit board and inserting the dip switch SW2 at that point. Normally all of the traces are held to ground as shown at pins 9-16, and the traces are broken at pins 1-8 of the dip switch. The dip switch is soldered into the circuit board at that point to close the opening or trace. In series with a dip switch is the RPACK1 unit which pulls all dip switch lines HIGH if the dip switch is OFF, and LOW if the dip switch is ON or in the normal condition. Pins P25, P26, P27, P28, P29, P30, P31 and P32 are test points to determine whether the dip switch is open or closed on each respective line. The dip switch SW2 and RPACK1 are in series. The corresponding pins 5, 6, 7 and 8 of the dip switch SW3 and RPACK1 are tied to pins 63, 62, 60 and 59 of the microprocessor (FIG. 6) via lines i4, i3, i2 and i1 for actuating options described but not shown herein. Resistors RPACK 1 provide pull-up for the microprocessor inputs on pins 2, 3, 4, 59, 60, 62, 63, 64, 65, 66 and 67 via pins 9-16 and lines x, y, z and i1-i8 (FIG. 9).

Figure 10:
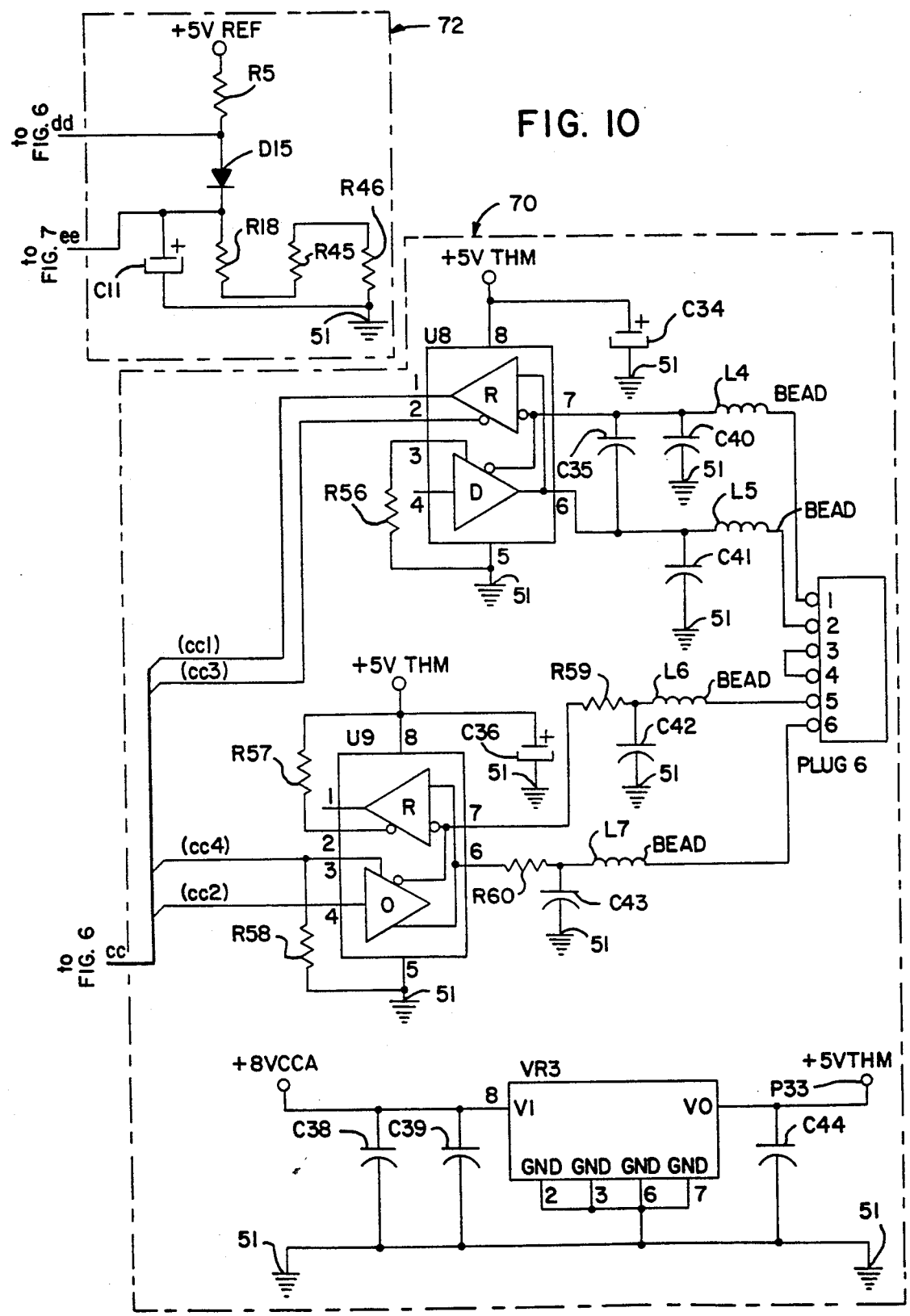

Jumper JP1 (FIG. 9) controls the power-off circuit 72 (FIG. 10). Jumper JP2 controls the optional memory 68 (FIG. 9), and jumper JP3 controls the optional RS485 computer interfae 70 (FIG. 10). When the optional circuits are used, the jumpers are cut or opened. The jumpers are shown closed here to illustrate the operability of the circuit when these options are not used. When closed, the jumpers are all tied to ground through jumper terminal JP6 (FIG. 6).

Power is supplied to pins 1 and 47 of the microprocessor U1 (FIG. 6). The capacitor C15 is a noise-suppression capacitor. Resistor R25 is a pull up resistor tied directly to pin 30 of the microprocessor to continuous pull it HIGH, indicating use of internal memory. Resistor 24 is tied to microprocessor pin 28 and provides an instantaneous reset whenever line n on pin 28 of the microprocessor is pulled to ground, pulling it HIGH whenever power is supplied to the microprocessor, independently of the sequence in the software code.

Note that pin 28 of the microprocessor is connected via line n through pins 11 and 6 of the driver U2 (FIG. 7) to the capacitor C44 and reset button SW1 (FIG. 7). This permits use of switch SW1 to generates a momentary pulse to reset the microprocessor. When power is cycled very rapidly and the system does not reset itself, then reset switch SW1 can be closed to manually actuate the reset cycle by generating a momentary pulse to pin 28 to reset the microprocessor U1.

The 12 MHz microprocessor crystal X1 (FIG. 7) is tied to the microprocessor pins 33 and 34 (FIG. 6) via lines r and s. The capacitor C14 (FIG. 7) is for noise suppression on the analog reference input pin 45 and is tied thereto via line t. The 10K ohm resistor R34 and the 3.32K ohm resistor R35 (FIG. 7) form a voltage divider and are tied to the microprocessor U1 (FIG. 6) at pin 39 via line u to monitor the 8VCCA voltage signal through diode D10. When power is lost, the microprocessor is programmed to recognize this and initiate a safe shutdown. The diode D10 is clamped to 5 volts to assure that the microprocessor is not destroyed by the presence of an overvoltage condition.

In typical operation, pins 1 and 47 provide power to the microprocessor U1, see FIG. 6. Microprocessor pin 2 is connected to jumper JP3 (FIG. 9) and when the input is LOW, i.e. the jumper is closed and tied to ground, the microprocessor will not go through the computer interface communication subroutine. When the jumper is cut and goes HIGH, the microprocessor will go through a communication software subroutine and communicate with the optional RS485 computer interface circuitry 70. In like manner, pin 3 is connected to jumper JP2 (FIG. 9) and when pulled HIGH, the subroutine to communicate with the optional memory circuit 70 is engaged. When pin 4 is pulled HIGH, jumper 7P1 engages the optional power off circuit 72.

Pin 5 is connected to the test switch SW3 (FIG. 9) via line aa. When the test switch is closed and power is supplied from the 5VCC power source, the input on pin 5 goes HIGH and, if at this time no current is passing through the current transformers 30a, 30b, 30c, a simulated overload subroutine will be activated by the microprocessor. As previously described, this causes pin 7 to go LOW. As stated, pin 7 is tied to transistor Q1 (FIG. 4) through pins 11 of the connectors M1 and F1 (FIG. 5). This causes the transistor Q1 (FIG. 4) in the test circuit 57 to turn ON, supplying a 5 volt signal to pin 15 of the multiplexer U5 (FIG. 5) via line f. This signal simulates an overload condition on the output pin 13 of the multiplexer U5. This output is tied to pin 38 of the microprocessor U1 via the gain amplifier U4A, pins 13 of connectors M1 anf F1 and gain adjustment potentiometer RP1 (FIG. 6). Once this simulated overload condition is present on pin 38 of the microprocessor, the subroutine generates a "flashing" signal on pin 57, i.e., the signal oscillates from HIGH to LOW. Pin 57 is tied to pin 2 of the driver U2 (FIG. 7) and the flashing signal causes red LED1 to flash on and off, as previously described. At the end of the flashing sequence, the output on microprocessor pin 57 is shifted to continuous HIGH and the red LED1 is steady ON. At this time, the output on microprocessor pin 54 is switched to LOW, which turns off the relay K1 (FIG. 5) via the driver U2 (FIG. 7) and pins 2 of the connectors M1 (FIG. 6) and F1 (FIG. 5). Pin 55 is programmed to oscillate between LOW and HIGH, causing the green LED2 to flash at each cycle via the driver U2. When the green LED2 stops flashing, the reset button SW1 can be pressed to reset the overload (or the overload is automatically reset if the option is activated by the presence of a HIGH signal on pin 59 of the microprocessor U1). At this point, pin 57 goes LOW, the red LED1 is turned off, pin 54 goes HIGH, and the relay K1 is energized, signaling the end of the test sequence.

When the reset switch SW1 (FIG. 7) is pressed and held down, and no current is flowing through current transformers 30a, 30b, 30c the full load amperage (FLA) can be adjusted at potentiometer RP1 (FIG. 6). Pin 6 of the microprocessor is connected to the reset button SW1 via line q and when HIGH, pins 8 and 10 are programmed to go HIGH and, via pins 10 and 9 of connectors M1 and F1, this is introduced into pins 10 and 9 of the multiplexer U5 (FIG. 5). When this occurs, the designated voltage as determined by the resistor divider R37 and R38 (FIG. 4) is input to pin 11 of the multiplexer U5 (FIG. 5) via line g. This is output at pin 13 of the multiplexer U5 and input at pin 3 of the operational amplifier U4A (FIG. 5). The output voltage at pin 1 of operational amplifier U4A (also accessible at test point P1 (FIG. 6) accessible from the outside) is dependent upon the feedback which is set by the potentiometer RP1 (FIG. 6) as connected through pins 12 and 13 of the connectors M1 and F1. The user may adjust the potentiometer RP1 and monitor the adjustment at the test point P1 so that the overload for a particular current range can be accurately set using the standard formula, where FLA d.c. volts is equal to three times the current transformation ratio divided by the motor FLA current. Once the reset switch SW1 (FIG. 7) is released and opened, pin 6 of the microprocessor U1 (FIG. 6) returns to LOW and the microprocessor goes out of the FLA adjustment mode. If current is flowing through the current transformers 30a, 30b, and 30c, both this function and the reset function are inactive.

When the overload is tripped and the green LED2 is not flashing and the red LED1 is on steady, the overload can be reset by pressing the reset switch SW1, as described above. At this point, the relay K1 (FIG. 5) is energized via pin 14 of the connectors M1 and F1, and LED1 is turned off. Microprocessor pin 28 (FIG. 6) is driven LOW when the reset button SW1 (FIG. 7) is depressed. This function is utilized when the microprocessor U1 locks up when the 120 volt power supply is lost and then re-established before the power supply has gone low enough to allow a normal reset of the microprocessor. Resistors R2, R4 and R16 (FIG. 7) are current limiting devices. Capacitors C2 and C26 (FIG. 7) are for noise suppression.

Microprocessor pin 37 (FIG. 6) is connected to the potentiometer RP2 (FIG. 7) via line o and this analog input is used to set the class of overload from 1 to 50 seconds. A digital volt meter may be attached across open pins P2 and P13 (FIG. 7) to determine the setting of potentiometer RP2. The capacitor C9 is for noise suppression and resistor R1 provides current limiting when the meter is attached.

Microprocessor pin 38 (FIG. 6) is the analog input for sensing the current which is multiplexed by the multiplexer U5 (FIG. 5) and is connected to node 60 (FIG. 6) through resistor R6. As stated, this multiplexed, combined signal is present at multiplexer U5, pin 13, with gain adjustment by amplifier U4A and is outputted at pin 1 of amplifier U4A (FIG. 5), where it is introduced, via pins 13 of connectors M1 and F1, gain potentiometer RP1, and resistor R6 to pin 38. Since the identity of the three discrete inputs is preserved in the combined signal, the multiplexer is programmed to redefine the three signals and store each of them in a designated register.

Pin 39 of the microprocessor U1 (FIG. 6) is the analog input which senses the presence or loss of 120 volts power by being tied directly to the 8VCCA source via line u as shown in FIG. 7. Pin 40 of the microprocessor U1 (FIG. 6) is connected to the potentiometer RP7 through resistor R33 (FIG. 7) via line p which is used to calculate the reset time under a tripped condition as previously described.

Pin 54 of the microprocessor is tied to the relay K1 (FIG. 5) via pin 2 of connectors F1 (FIG. 5) and M1 (FIG. 6), line m, and pins 12 and 5 of driver U2 (FIG. 7) and line k1 (FIGS. 7 and 6). Pin 55 is tied to the green LED2 (FIG. 7) via line k2, as previously described. As the microprocessor is programmed, when the green LED2 is flashing, it is providing an indication that the overload is not ready to be reset after trip has occurred. During this time, the signal on pin 54 is held LOW and the relay K1 cannot be reset. When the light LED2 goes steady ON the relay can be reset manually or automatically. If the green LED2 is OFF and the red LED1 is ON, there is a microprocessor fault.

Pin 57 of the microprocessor (FIG. 6) controls the red LED1 (FIG. 7) via line k4, as previously described. As programmed, when the red LED1 flashes, it indicates an impending overload trip and when the red LED is on steady, it indicates that the overload has tripped.

Pin 58 of the microprocessor U1 (FIG. 6) pulses pin 1 of driver U2 (FIG. 5) via line k5 to keep capacitor C13 (FIG. 8) discharged thereby preventing the watch dog timer from tripping the overload relay, as previously described.

When pin 59 of the microprocessor U1 (FIG. 6) is LOW, reset of the overload circuit can be performed as follows: once the overload trips, the user has to manually push the reset switch SW1 (FIG. 7) to energize the relay k1 (FIG. 5) via pins 14 of the connectors M1 and F1. When the pin 59 is HIGH and the overload is tripped, the microprocessor U1 automatically determines when to reset the overload based upon the reset time as set at potentiometer RP7 and resistor R33 (FIG. 7), the overload class setting at potentiometer RP2, and the prior thermal energy conditions.

The class of overload is determined by the setting of potentiometer RP2 and the thermal energy calculated to bring the motor up to speed the previous time. If the overload circuit detects zero current through any of the current transformers 30a, 30b, 30c during start-up of the motor 14, the overload will trip in 60 milliseconds.

The trip delay time is manually set at potentiometer RP2, as described. Also, the microprocessor U1 is programmed to recalculate the trip delay time based on previous motor operating conditions. For example, if the motor trips out upon start-up, a "cold trip" curve in accordance with NEMA standards (National Electrical Manufactures Association), is followed and the delay time is automatically altered by the microprocessor. If the motor trip after achieving 100% FLA, then dropping below 100%, then increasing to trip level, the trip delay time is shorter than the "cold" condition delay. The microprocessor U1 is programmed to rely on either the NEMA "cold trip" curve and the NEMA "hot trip" curve, depending on conditions of the motor, wherein the "cold" curve is relied on when the motor is initially powered up and the "hot" curve is relied on after reaching 60% thermal memory.

These features are only active when the current being sensed by the overload relay has risen above 100% FLA and then has gone below 100% FLA. In the embodiment illustrated, the undercurrent trip option, jammed delay overload option; phase-loss option and phase unbalance option may be used or not used, as desired. The microprocessor U1 is programmed, however, to utilize these options when desired, and the pin response for these is as follows:

When pin 60 of the microprocessor U1 is HIGH, the undercurrent trip option is activated. This feature causes the overload relay to trip to de-energize relay K1 when the sensed current falls below 70% FLA.

Pin 62 of the microprocessor controls the uncurrent trip delay overload trip time also through the dip switch SW2. When pin 62 is LOW, the trip time is 60 milliseconds. When it is HIGH, the delay time is 2 seconds.

Pins 63 and 64 of the microprocessor are used to set the threshold current when a jam is detected. If the current sensed by the overload goes above the current specified by the jam level, the overload will trip and the relay K1 will de-energize in the amount of time selected by the jam delay. When pins 63 and 64 are LOW, the jam function is de-energized. When pins 63 is HIGH and pin 64 is LOW, the jam current is at 100% FLA. When pin 63 is LOW and pin 64 is HIGH, the jam current is at 125% FLA. When pins 63 and 64 are both HIGH, the jam current is at 200% FLA. Pin 65 of the microprocessor controls the jam delay trip time. When pin 65 is LOW, the trip time is 60 milliseconds. When pin 65 is HIGH, the jam delay time is 2 seconds.

Pin 56 of the microprocessor controls the phase-loss option and is tied to the POWER OFF timer 72 (FIG. 10) via pins 3 and 14 of the driver U2 (FIG. 7) via lines k3 and ee. When pin 66 of the microprocessor is LOW, the phase-loss option is turned off. If the loss of any one phase causes excess current to be sensed in the other two current transformers, the overload will trip based on the normal trip curve selected. When pin 66 is HIGH, the phase-loss option is activated. If the overload detects zero current through any of the current transformers 30a, 30b, 30c, the overload will trip and the relay K1 will be de-energized in 60 milliseconds.

Pin 67 of the microprocessor controls the phase unbalance option. When pin 67 is LOW, the feature is deactivated. When pin 67 is HIGH and the calculated current unbalance exceeds 15% based on the following equation:

$$\frac{(\text{MAX. Current}) - (\text{MIN. Current})}{\text{AVG. Current}} \times 100\%,$$

the overload relay will trip and relay K1 will be deactivated.

The overload can be reset instantaneously by depressing the reset button SW1 (FIG. 7) whenever the overload circuit is tripped in response to undercurrent trip, jam trip, phase loss or phase unbalance conditions.

11. Remote Reset Circuit

Also shown in the preferred embodiment is an optional remote reset circuit 64 (FIG. 5). Pin 3 of the transistor side of a PC814IA optocoupler ISO1 is tied to pin 6 of the microprocessor U1 via pins 14 and line q of the connectors M1 and F1. The reset switch SW1 (FIG. 7) is also connected to node 65, line q (FIG. 7). The four 10K ohm resistors R43, R44, R47 and R48 provide the drive for the optocouplers. The capacitor C25 is provided for noise suppression. Pins 1 and 2 of the optocoupler ISO1 are connected directly to a 120 volt power source through the terminal block TB3. When power is supplied across the terminals on block TB3, the ISO1 transistor is turned on and pin 3 of the resistor produces a HIGH signal on pin 6 of the microprocessor via pins 14 of the connectors F1 and M1 (FIG. 6) and line q. This resets the overload circuit after completion of the reset delay. Capacitor C16 (FIG. 6) is for noise suppression.

12. Memory Circuit

As illustrated, the overload device of the subject invention includes an optional memory circuit 68 (FIG. 9). The optional memory circuit 68 includes an NMC93C46M nonvolatile serial memory chip U3 manufactured by National Semiconductor. Typically, the optional memory circuit would be used in conjunction with the RS485 communication network interface 70 (FIG. 8), or in conjunction with use defined requirements. The optional memory circuit output pins 7 and 6 are tied to the microprocessor pins 12 and 11 via lines bb and h1. The optional memory circuit will permit the user to program various options into the microprocessor, including, by way of example, overcurrent, undercurrent, trip delay time, phase unbalance, jam level, data logging storage, CT transformation ratio, starting current value, and potentially overvoltage and undervoltage sensing. Data is entered into the memory chip U3 pin 3 on line h4 and output a chip U3, pin 4 on line n into microprocessor pin 13 (FIG. 6). Pin 3 of the memory chip U3 is tied to microprocessor pin 14 via line h4, and pin 4 of the memory chip U3 is tied to microprocessor pin 13 via line n. The clocking inputs to the memory circuit are on pins 1 and 2, tied to the microprocessor at pins 16 and 15 via line h2 and h3, respectively. Microprocessor pin 3 (FIG. 6) is connected to jumper JP2 (FIG. 9) via line z for activation of the memory circuit option. When pin 16 of the microprocessor is HIGH, pin 1 of the memory chip U3 is HIGH, enabling the memory circuit. Typically, the memory chip is to be loaded via input from a computer coupled to the computer interface circuitry 70 via microprocessor pins 19, 20, 21 and 22 via lines cc1, cc2, cc3, cc4 (from the interface, FIG. 5) and pins 13 and 14 via lines n and h4 (to the memory, FIG. 9). Resistors R8, R10 and R39 (FIG. 9) are current limiters. Capacitor 20 (FIG. 9) is for noise suppression.

13. Computer Interface

The computer interface circuitry 70 (FIG. 8) is a standard Cutler-Hammer E-Link RS485 interface, manufactured by the assignee of the subject invention, and comprises a pair of SN75ALS176D chips U8 and U9. The interface circuitry is tied to the microprocessor (FIG. 6) at pins 19, 20, 21 and 22 via lines cc1, cc2, cc3 and cc4, as shown. The circuit U8 is the receiver for accepting communication from a computer (not shown) via pins 1 and 2 of the PLUG 6. The metal beads L4 and L5 and the capacitors C40 and C41 are provided for noise suppression. The voltage drop between the lines is developed at the 0.1 microfarad capacitor C35 and entered into the chips U8 at pins 6 and 7. Resistor R56 is a current limiter.

Circuit U9 is the transmit circuit for receiving information from pin 19 of the microprocessor U1 and introducing it to the computer via pins 5 and 6 of PLUG 6. The two resistors R59 and R60 are current limiting and the capacitors C42 and 43 as well as beads L6 and L7 provide noise suppression on the transmitted data. Resistors R57 and R58 are current limiting resistors.

The supplemental power supply VR3 is required to isolate the interface power supply from the remainder of the overload circuit. The 8VCCA power source is introduced at pin 8 of the LM78LO5ACM voltage regulator, as filtered by the capacitor network C38 and C39. The output at pin 1 of the regulator VR3 is filtered by the capacitor C44 to produce a smooth 5 volt supply 5VTHM at pin P33 and this is introduced into pins 8 of circuits U8 and U9, as shown, to drive the computer interface.

14. Power-Off Time

The optional power-off timer circuit 72 (FIG. 10) monitors the condition on pin 41 of the microprocessor via line dd. The resistor R5 provides current limiting for charging up the capacitor C11 through diode D15. When the control power is lost during a normal mode and everything is operating in the proper manner, the capacitor C11 is discharged by the drive circuit U2 at pin 14 via line ee. When the microprocessor (FIG. 6) senses it is losing power on line u from the circuitry defined by resistors R34, R35 and diode D10 (FIG. 7), pin 57 of the microprocessor goes LOW, driving pin 3 of driver circuit U2 via line k4 driving pin 14 of the driver U2 LOW and discharging the capacitor C11 (FIG. 10). When power is restored, and current flows through diode D15 (FIG. 10), charging capacitor C11.

The instantaneous voltage signal present on diode D15 is also fed directly into the microprocessor at pin 41 via line dd. The microprocessor reads the voltage across the capacitor 11 to determine if it is discharged LOW i.e. lower than pin 41 of the microprocessor, or if it is charged HIGH, i.e. as high as pin 41 of the microprocessor. Assuming that the microprocessor recognized a fault before power was shut off, pin 14 of the driver U2 would not go LOW and the capacitor C11 would still be charged. When this occurs, resistors R18, R45 and R46 (FIG. 10) provide a bleeding effect for the capacitor C11 to discharge at a predetermined rate. After a predetermined time, the capacitor C11 would be discharged enough to signal to the microprocessor that upon control power being supplied, the motor can be started after a fault condition. If the time of power loss is shorter than five minutes, the capacitor c11 will still be charged. In this case, the microprocessor reads a voltage across capacitor C11 upon control power being applied, and starts the reset timing from that point.

15. The Microprocessor Program

The functional software statement for operating microprocessor U1 follows. The statement is written in assembly language. As written, the program is broken into six columns, reading from left to right as follows:

1. STNO, which is the statement number;
2. ADRS, which is the address within the microprocessor chip where the function is located;
3. R, which is an error code (not used);
4. OBJECT, which is the source statement written in object language suitable to the selected microprocessor;
5. M, which is not used; and
6. SOURCE STATEMENT, which is an English language statement of the statement function;

The program begins at statement No. 52. Statements 1-52 are not related to the operation of this invention.

```
52                          ;
53      0003                FLTST1  EQU     03H     ;FAULT SATUS INDICATIONS
54                                                  ;   1 - FAULT
55                                                  ;BIT 0  OVERLOAD
56                                                  ;    1
57                                                  ;    2  POWER FAIL
58                                                  ;    3  LOW I ALARM
59                                                  ;    4  JAM
60                                                  ;    5  PHASE UNBAL
61                                                  ;    6  PHASE LOSS
62                                                  ;    7
63                          ;
64      0004                FLTST2  EQU     04H     ;BIT 0
65                          ;
66      0006                ITOTL   EQU     06H     ;TOTAL CURRENT VAL LOW 8
BITS
67      0007                ITOTM   EQU     07H     ;MID 8 BITS
68      0008                ITOTH   EQU     08H     ;HIGH 8 BITS
69      0009                IAVGLO  EQU     09H     ;AVG I LOW PH VAL
70      000A                IAVGMD  EQU     0AH     ;       MID PH VAL
71      000B                IAVGHI  EQU     0BH     ;       HIGH PH VAL
72      000C                IAVGP1  EQU     0CH     ;       PHASE ONE
73      000D                IAVGP2  EQU     0DH     ;       PHASE TWO
74      000E                IAVGP3  EQU     0EH     ;       PHASE THREE
75                          ;
76      FF06                ITOTLA  EQU     0FF06H  ;16 BIT ITOTL ADRESS
77      FF07                ITOTMA  EQU     0FF07H  ;16 BIT ITOTL MID BITS
78      FF08                ITOTHA  EQU     0FF08H  ;16 BIT ITOTH ADRESS
79                          ;
80      0016                ISUML1  EQU     16H     ;PH 1 I SUM LOW
81      0017                ISUMH1  EQU     17H     ;         HIGH
82      0018                ISUML2  EQU     18H     ;PH 2 I SUM LOW
83      0019                ISUMH2  EQU     19H     ;         HIGH
84      001A                ISUML3  EQU     1AH     ;PH 3 I SUM LOW
85      001B                ISUMH3  EQU     1BH     ;         HIGH
86                          ;
87      FF16                ISUM1   EQU     0FF16H  ;16 BIT I SUM PH 1 ADDR
88      FF18                ISUM2   EQU     0FF18H  ;16 BIT I SUM PH 2 ADDR
89      FF1A                ISUM3   EQU     0FF1AH  ;16 BIT I SUM PH 3 ADDR
90                          ;
91      0022                GAINSL  EQU     22H     ;AMPLIFER GAIN SETTING
92      0023                GAINSH  EQU     23H     ;LOW AND HIGH BITS
93      0024                RTSUML  EQU     24H     ;RESET TIME SUM LOW
94      0025                RTSUMH  EQU     25H     ;RESET TIME SUM HIGH
95      0026                TMSUML  EQU     26H     ; TIMESET SUM LOW
```

| | | | | | |
|---|---|---|---|---|---|
| 96 | 0027 | | TMSUMH | EQU | 27H ; TIMESET SUM HIGH |
| 97 | 0028 | | TSTVA1 | EQU | 28H ;THERMAL START VALS |
| 98 | 0029 | | TSTVA2 | EQU | 29H ; |
| 99 | 002A | | TRSTV1 | EQU | 2AH ;THERMAL RESET VALS |
| 100 | 002B | | TRSTV2 | EQU | 2BH ; |
| 101 | 002C | | AGAINS | EQU | 2CH ;AVG GAIN SETTING |
| 102 | 002D | | UNLDLY | EQU | 2DH ;UNDER I TRIP DELAY |
| 103 | 002E | | JAMDLY | EQU | 2EH ;TRIP TIME DELAY VAL |
| 104 | 002F | | HTLOSS | EQU | 2FH ;HEAT LOSS VAL |
| 105 | | ; | | | |
| 106 | FF22 | | GAINSM | EQU | 0FF22H ;16 BIT AMP GAIN SUM ADC |
| 107 | FF24 | | RTSUM | EQU | 0FF24H |
| 108 | FF26 | | TIMSUM | EQU | 0FF26H ;16 BIT TIMESET ADDR |
| 109 | FF28 | | TSTVAL | EQU | 0FF28H ;16 BIT THERMAL START V? |
| 110 | FF2A | | TRSETV | EQU | 0FF2AH ;16 BIT THERMAL RESET V? |
| 111 | | ; | | | |
| 112 | 0031 | | TIMSET | EQU | 31H ;600 %FLA TRIP TIME VAL |
| 113 | 0032 | | PWRVAL | EQU | 32H ;POWER VAL LOW |
| 114 | 0033 | | PWRVAH | EQU | 33H ;POWER VAL HIGH |
| 115 | FF32 | | PWRVAA | EQU | 0FF32H ;16 BIT PWR VAL ADDR |
| 116 | 0034 | | PWRAVG | EQU | 34H ;LINE POWER AVG |
| 117 | 0035 | | TITOTL | EQU | 35H ;ITOT AT TEST START |
| 118 | 0036 | | TITOTM | EQU | 36H |
| 119 | 0037 | | TITOTH | EQU | 37H |
| 120 | | ; | | | |
| 121 | | | | | |
| 122 | 0050 | | TIM01 | EQU | 50H ; RESET COUNTER |
| 123 | 0051 | | TIM02 | EQU | 51H ; 0.5 SEC TIMER |
| 124 | 0052 | | TIM03 | EQU | 52H ; JAM DELAY COUNTER |
| 125 | 0053 | | TIM04 | EQU | 53H ; PH UNBAL COUNTER |
| 126 | 0054 | | TIM05 | EQU | 54H ; PH LOSS COUNTER |
| 127 | 0055 | | TIM06 | EQU | 55H ; SETUP TIMER |
| 128 | 0056 | | TIM07 | EQU | 56H ; CYCLE COUNTER |
| 129 | 0057 | | TIM08 | EQU | 57H ; 0.01 SEC COUNTER |
| 130 | 0058 | | TIM09 | EQU | 58H ; UP TO SPEED COUNTER |
| 131 | 0059 | | TIM10 | EQU | 59H ; UNDER I COUNTER |
| 132 | 005A | | TIM11 | EQU | 5AH ; PWR FAIL COUNTER |
| 133 | 005B | | TIM12 | EQU | 5BH ; START / STOP COUNTER |
| 134 | 005C | | TIM13 | EQU | 5CH ; TEST CYCLE START COUNT |
| 135 | | ; | | | |
| 136 | 0060 | | TSTOR1 | EQU | 60H ;TEMPORARY STOR LOC 1 |
| 137 | 0061 | | TSTOR2 | EQU | 61H ; 2 |
| 138 | 0062 | | TSTOR3 | EQU | 62H ; 3 |
| 139 | 0063 | | TSTOR4 | EQU | 63H ; 4 |
| 140 | 0064 | | TSTOR5 | EQU | 64H ; 5 |
| 141 | 0065 | | TSTOR6 | EQU | 65H ; 6 |

| | | | | | | |
|---|---|---|---|---|---|---|
| 142 | 0066 | | TSTOR7 | EQU | 66H | ; 7 |
| 143 | 0067 | | TSTOR8 | EQU | 67H | ; 8 |
| 144 | FF60 | | TSTR1 | EQU | 0FF60H | ;16 BIT TEMP STOR LOC AD: |
| 145 | FF62 | | TSTR2 | EQU | 0FF62H | |
| 146 | FF64 | , | TSTR3 | EQU | 0FF64H | |
| 147 | FF66 | | TSTR4 | EQU | 0FF66H | |
| 148 | | ; | | | | |
| 149 | | ; | | | | |
| 150 | | ; | | EQUATES | | |
| 151 | | ; | | | | |
| 152 | 0010 | | FLA040 | EQU | 010H | ; 40 % FLA VAL |
| 153 | 0014 | | FLA050 | EQU | 014H | ; 50 % |
| 154 | 0018 | | FLA060 | EQU | 018H | ; 60 % |
| 155 | 001C | | FLA070 | EQU | 01CH | ; 70 % |
| 156 | 0020 | | FLA080 | EQU | 020H | ; 80 % |
| 157 | 0024 | | FLA090 | EQU | 024H | ; 90 % |
| 158 | 0028 | | FLA100 | EQU | 028H | ;100 % |
| 159 | 002B | | FLA108 | EQU | 02BH | ;108 % |
| 160 | 002E | | FLA117 | EQU | 02EH | ;117 % |
| 161 | 0032 | | FLA125 | EQU | 032H | ;125 % |
| 162 | 003C | | FLA150 | EQU | 03CH | ;150 % |
| 163 | 0050 | | FLA200 | EQU | 050H | ;200 % |
| 164 | 00F0 | | FLA600 | EQU | 0F0H | ;600 % |
| 165 | 0737 | | HTFACT | EQU | 00737H | ;HEAT FACTOR - IMAX/1500 |
| 166 | 000F | | IBAL | EQU | 00FH | ;UNBAL I % MAX VAL |
| 167 | 0030 | | IMAXR | EQU | 030H | ;MAX I WHEN UP TO SPEED 120% FLA |
| 168 | 000A | | IMIN | EQU | 00AH | ;SET MIN RUN I |
| 169 | 0874 | | IM040 | EQU | 00874H | ;40% LOAD THERMAL VAL - 20% ITOT |
| 170 | 0A91 | | IM050 | EQU | 00A91H | ;50% - 25% ITOT |
| 171 | 0CAE | | IM060 | EQU | 00CAEH | ;60% - 30% ITOT |
| 172 | 0ECB | | IM070 | EQU | 00ECBH | ;70% - 35% ITOT |
| 173 | 10E8 | | IM080 | EQU | 010E8H | ;80% - 40% ITOT |
| 174 | 1305 | | IM090 | EQU | 01305H | ;90% - 45% ITOT |
| 175 | 1522 | | IM100 | EQU | 01522H | ;100% - 50% ITOT |
| 176 | 195C | | IM120 | EQU | 0195CH | ;120% - 60% ITOT |
| 177 | 08A2 | | IRUN | EQU | 008A2H | ;NORMAL MAX I SQ RUN VAL 2117 |
| 178 | 4450 | | ITOTML | EQU | 04450H | ;MAX TOTAL I VAL LOW 16 BITS |
| 179 | 002A | | ITOTMH | EQU | 02AH | ;HIGH 8 BITS  2,774,70 |
| 180 | 2A44 | | ITOTMM | EQU | 02A44H | ;HIGH 16 BITS |
| 181 | 1000 | | ITOTNL | EQU | 01000H | ;MIN TOTAL I FOR RESET |
| 182 | 0000 | | ITOTNH | EQU | 000H | ;LOW 16 BITS AND HIGH 8 BITS |

```
183      0002                        LINDLY  EQU    002H    ;LINE LOSS TRIP DELAY VAL
- 60 USEC
184      0032                        RFREQ5  EQU    032H    ;READING FREQ X 5
185      000A                        RDFREQ  EQU    00AH    ;READING FREQ VAL
186      0002              ,         SSTDLY  EQU    002H    ;START / STOP DELAY TIME
187      0002                        UNBDLY  EQU    002H    ;LINE UNBAL TRIP DELAY VA
- 60 USEC
188
189                       ;
190                       ;
191                       ;          PORT ASSIGNMENTS
192                       ;
193                       ;   AN     0    TRIP TIME VAL
194                       ;          1    FLA INPUT
195                       ;          2    LINE PWR VAL
196                       ;          3    RESET TIME
197                       ;          4    PWR OFF CAP VOLTAGE
198                       ;          5
199                       ;          6
200                       ;          7
201                       ;
202                       ;   PA     0    JUMPER  1 PWR OFF CKT USED - 1
203                       ;          1            2 MENORY USED -1
204                       ;          2            3 RS422 USED -1
205                       ;          3    TEST SW INPUT 1 - TEST
206                       ;          4    RESET SW IN
207                       ;          5    TEST CKT CONTROL 1 - OFF
208                       ;          6    MUX ADD SEL 2
209                       ;          7    MUX ADD SEL 1
210                       ;
211                       ;
212                       ;   PB     0    MENORY PE
213                       ;          1    MENORY PRE
214                       ;          2    MENORY DO
215                       ;          3    MENORY DI
216                       ;          4    MENORY SK
217                       ;          5    MENORY CS
218                       ;          6
219                       ;          7
220                       ;
221                       ;   PC     0    TXD RS485 TRANS
222                       ;          1    RXD RS485 REC
223                       ;          2    COMM CONTROL 1
224                       ;          3                 2
225                       ;          4
226                       ;          5
```

```
227                  ;           6
228                  ;           7
229                  ;
230                  ;    PD     0    MANUAL(0)/AUTO(1)  RESET
231                  ;           1    UNDER I TRIP ON(1)
232                  ;           2    UNDER I DELAY 60 USEC / 2 SEC
233                  ;           3    JAM      (0)      (1)      (0)
(1)
234                  ;           4    JAM      (0)      (0)      (1)
(1)
235                  ;                CURRENT OFF     108%     125%
200%
236                  ;           5    JAM DELAY 60 USEC / 2 SEC
237                  ;           6    PHASE LOSS OFF(0) / ON(1)
238                  ;           7    PHASE UNBAL OFF(0) / ON(1)
239                  ;
240                  ;    PF     0
241                  ;           1
242                  ;           2
243                  ;           3    TRIP RELAY
244                  ;           4    SYS READY LED
245                  ;           5    PWR OFF FAULT CONTROL
246                  ;           6    TRIP LED   1 = ON
247                  ;           7    WATCHDOG (0.02) SEC F/F
248                  ;
249                  ;
250 0000                   ORG    0000H
251 0000  548705           GJMP   RESET
252 0004                   ORG    0004H
253 0004  548705           GJMP   RESET
254 0007  62               RETI
255 0008                   ORG    0008H
256 0008  54C101           GJMP   TIMFLG
257 000B  62               RETI
258 0010                   ORG    0010H
259 0010  AA               EI
260 0011  62               RETI
261 0018                   ORG    0018H
262 0018  150240           ORIW   TMFLAG,040H    ;SET 20 MSEC BIT
263 001B  AA               EI
264 001C  62               RETI
265 0020                   ORG    0020H
266 0020  150220           ORIW   TMFLAG,020H    ;SET SAT BIT
267 0023  AA               EI
268 0024  62               RETI
269 0028                   ORG    0028H
270 0028  AA               EI
```

```
271  0029   62                      RETI
272  0060                           ORG     0060H
273  0060   AA                      EI
274  0061   62                      RETI
275                          ;      
276                          ;      
277                          ;                DATA VALUES
278                          ;
279  00C0                           ORG     00C0H 280  00C0   10          DATA01:DB   010H,01AH,005H  ;TIMER VAL FOR 500 USEC
     00C1   1A
     00C2   05
281                          ;
282                          ;
283                          ;
284                          ;
285                          ;
286                          ;
287                          ;                A - D READ SUB
288                          ;
289  00C3   4CE0        ADREAD:MOV  A,CR0
290  00C5   1A                  MOV B,A
291  00C6   4CE1                MOV A,CR1
292  00C8   60B2                SUBNB A,B
293  00CA   483A                NEGA
294  00CC   2702                GTI  A,02H
295  00CE   4E30                GJMP ADREND
296  00D0   4CE2                MOV  A,CR2
297  00D2   60B2                SUBNB A,B
298  00D4   483A                NEGA
299  00D6   2702                GTI  A,02H
300  00D8   4E26                GJMP ADREND
301  00DA   4CE3                MOV  A,CR3
302  00DC   60B2                SUBNB A,B
303  00DE   483A                NEGA
304  00E0   2702                GTI  A,02H
305  00E2   DD                  GJMP ADREND
306  00E3   4CE1                MOV  A,CR1
307  00E5   1A                  MOV  B,A
308  00E6   4CE2                MOV  A,CR2
309  00E8   60B2                SUBNB A,B
310  00EA   483A                NEGA
311  00EC   2702                GTI  A,02H
312  00EE   D1                  GJMP ADREND
313  00EF   4CE3                MOV  A,CR3
314  00F1   60B2                SUBNB A,B
315  00F3   483A                NEGA
```

```
316 00F5  2702              GTI    A,02H
317 00F7  C8                GJMP   ADREND
318 00F8  4CE2              MOV    A,CR2
319 00FA  1A                MOV    B,A
320 00FB  4CE3              MOV    A,CR3
321 00FD  60BA           ,  LTA    A,B
322 00FF  1A                MOV    B,A
323 0100  0A         ADREND:MOV    A,B
324 0101  B8                RET
325                     ;
326                     ;              DELAY TIME SUB
327                     ;
328 0102  BA         DLYSUB:DI
329 0103  6407BD            MVI    MKL,0BDH       ;SET INT REG
330 0106  0502BF            ANIW   TMFLAG,0BFH    ;RESET 20 MSEC BIT
331 0109  44204E            LXI    EA,04E20H      ;20MSEC VAL
332 010C  48D3              DMOV   ETM1,EA ;LOAD COUNT VAL
333 010E  696C              MVI    A,06CH
334 0110  4DCC              MOV    ETMM,A         ;START COUNTER
335 0112  AA         DLYSU1:EI
336 0113  5E02              BIT    6,TMFLAG       ;WAIT FOR TIMEOUT
337 0115  FC                GJMP   DLYSU1
338 0116  BA                DI
339 0117  6900              MVI    A,00           ;RESET COUNTER
340 0119  4DCC              MOV    ETMM,A
341 011B  6407FD            MVI    MKL,0FDH       ;RESET INT REG
342 011E  0502BF            ANIW   TMFLAG,0BFH    ;RESET 20 MSEC BIT
343 0121  B8                RET
344                     ;
345                     ;
346                     ;              CURRENT UNBALANCE SUB
347 0122  BA         IUNBAL:DI
348 0123  6A03              MVI    B,03H
349 0125  6B00              MVI    C,00H
350 0127  010C              LDAW   IAVGP1
351 0129  74A00D            ADDNCW IAVGP2
352 012C  43                INR    C
353 012D  74A00E            ADDNCW IAVGP3         ;ADD THREE I VALUES
354 0130  43                INR    C
355 0131  19                MOV    EAL,A          ;SAVE TOTAL IN EA
356 0132  0B                MOV    A,C
357 0133  18                MOV    EAH,A
358 0134  483E              DIV    B              ;FIND AVG VAL
359 0136  743A05            LTI    B,05H          ;ROUND OFF VAL
360 0139  A8                INX    EA
361 013A  09                MOV    A,EAL
```

```
362 013B  6364              STAW    TSTOR5          ;SAVE AVG
363 013D  74B00B            SUBNBW  IAVGHI          ;FIND DIFF
364 0140  483A              NEGA
365 0142  1B                MOV     C,A             ;SAVE IN C
366 0143  0164              LDAW    TSTOR5
367 0145  74B009            SUBNBW  IAVGLO          ;FIND SEC DIFF
368 0148  483A              NEGA
369 014A  60AB              GTA     A,C             ;TEST FOR LARGEST DIFF
370 014C  0B                MOV     A,C
371 014D  19                MOV     EAL,A
372 014E  6A64              MVI     B,64H
373 0150  482E              MUL     B               ;FIND PERCENTAGE DIFF
374 0152  0164              LDAW    TSTOR5
375 0154  6700              NEI     A,000H
376 0156  D6                GJMP    IUNBA4          ;SKIP IF I = ZERO
377 0157  483D              DIV     A
378 0159  08                MOV     A,EAH
379 015A  3701              LTI     A,01            ;TEST MAX UNBAL
380 015C  C4                GJMP    IUNBA3
381 015D  09                MOV     A,EAL
382 015E  270F              GTI     A,IBAL
383 0160  CC                GJMP    IUNBA4
384 0161  150320    IUNBA3: ORIW    FLTST1,020H     ;SET FAULT IND
385 0164  3053              DCRW    TIM04           ;DEC TIMER
386 0166  CE                GJMP    IUNBA5          ;JMP IF OK
387 0167  150320            ORIW    FLTST1,020H     ;SAVE FAULT IND
388 016A  547505            GJMP    TRIPOV          ;TRIP OVERLOAD
389 016D  0503DF    IUNBA4: ANIW    FLTST1,0DFH     ;RESET FAULT IND
390 0170  255302            GTIW    TIM04,UNBDLY    ;ADJ TIMER VAL
391 0173  2053              INRW    TIM04
393 0176  B8                RET
394                         ;
395                         ;       OVERLOAD RESET SUB
396 0177  0500FB    OVRSET: ANIW    STIND1,0FBH     ;RESET SYS READY LED
397 017A  645820            OFFI    PA,020H ;CHECK FOR TEST CKT
398 017D  CC                GJMP    OVSET0          ;JMP IF NOT USED
399 017E  0135              LDAW    TITOTL          ;RESET I TOTALS
400 0180  6306              STAW    ITOTL           ;LOW
401 0182  0136              LDAW    TITOTM
402 0184  6307              STAW    ITOTM           ;MID
403 0186  0137              LDAW    TITOTH
404 0188  6308              STAW    ITOTH           ;HIGH
405 018A  644B01    OVSET0: ONI     PD,01H          ;TEST FOR AUTO-RESET
406 018D  C4                GJMP    OVSET1          ;JMP IF NOT USED
407 018E  650301            NEIW    FLTST1,01H
408 0191  C4                GJMP    OVSET2          ;RESET IF OVERLOAD
409 0192  644810    OVSET1: ONI     PA,010H ;TEST FOR RESET
410 0195  D6                GJMP    OVSET3
```

```
411 0196  3050             OVSET2: DCRW    TIM01
412 0198  B8                       RET                         ;RET IF NOT TIMED OUT
413 0199  710300                   MVIW    FLTST1,00H
414 019C  715031                   MVIW    TIM01,31H
415 019F  0500F7                   ANIW    STIND1,0F7H         ;RESET OVERLOAD
416 01A2  640DBF                   ANI     PF,0BFH             ;TURNOFF TRIP LED
417 01A5  641820                   ORI     PA,020H             ;TURNOFF TEST CKT
418 01A8  641D18                   ORI     PF,018H             ;RESET RELAY & SYS LED
419 01AB  B8                       RET
420 01AC  255040           OVSET3: GTIW    TIM01,40H            ;TEST FOR MAX VAL
421 01AF  2050                     INRW    TIM01
422 01B1  B8                       RET
423                        ;
424                        ;
425                        ;                POWER OFF SUB
426 01B2  640500           PWROFF: MVI     PF,00                ;DISABLE OUTPUTS
427 01B5  5B00                     BIT     3,STIND1
428 01B7  641D20                   ORI     PF,020H             ;DISCHARGE CAP IF NOT TRIPPED
429 01BA  00                       NOP
430 01BB  48BB                     STOP
431 01BD  00                       NOP
432 01BE  548705                   GJMP    RESET
433                        ;
434                        ;                TIMER FLAG SUB
435 01C1  5F00             TIMFLG: BIT     7,STIND1            ;CHECK SETUP
436 01C3  545405                   GJMP    TIMF27              ;JMP IF ACTIVE
437 01C6  10                       EXA
438 01C7  4CC0                     MOV     A,PA                ;READ MUX SAT
439 01C9  07C0                     ANI     A,0C0H
440 01CB  77C0                     EQI     A,0C0H
441 01CD  D8                       GJMP    TIMF01
442 01CE  4CE1                     MOV     A,CR1
443 01D0  74A022                   ADDNCW  GAINSL              ;ADD GAIN VAL
444 01D3  2023                     INRW    GAINSH
445 01D5  6322                     STAW    GAINSL
446 01D7  4CE3                     MOV     A,CR3
447 01D9  74A024                   ADDNCW  RTSUML              ;ADD RESET TIME VAL
448 01DC  2025                     INRW    RTSUMH
449 01DE  6324                     STAW    RTSUML
450 01E0  64083F                   ANI     PA,03FH
451 01E3  10                       EXA
452 01E4  AA                       EI
453 01E5  62                       RETI
454 01E6  7700             TIMF01: EQI     A,00H
455 01E8  DB                       GJMP    TIMF02
456 01E9  4CE1                     MOV     A,CR1
457 01EB  74A016                   ADDNCW  ISUML1              ;ADD I PH ONE
```

| | | | | | |
|---|---|---|---|---|---|
| 458 | 01EE | 2017 | | INRW | ISUMH1 |
| 459 | 01F0 | 6316 | | STAW | ISUML1 |
| 460 | 01F2 | 4CE0 | | MOV | A,CR0 ;ADD TIMSET NUM |
| 461 | 01F4 | 74A026 | | ADDNCW | TMSUML |
| 462 | 01F7 | 2027 | | INRW | TMSUMH |
| 463 | 01F9 | 6326 | | STAW | TMSUML |
| 464 | 01FB | 64083F | | ANI | PA,03FH ;INC MUX ADD |
| 465 | 01FE | 641840 | | ORI | PA,40H |
| 466 | 0201 | 10 | | EXA | |
| 467 | 0202 | AA | | EI | |
| 468 | 0203 | 62 | | RETI | |
| 469 | 0204 | 7740 | TIMF02: | EQI | A,40H |
| 470 | 0206 | DB | | GJMP | TIMF03 |
| 471 | 0207 | 4CE1 | | MOV | A,CR1 |
| 472 | 0209 | 74A018 | | ADDNCW | ISUML2 ;ADD I PH TWO |
| 473 | 020C | 2019 | | INRW | ISUMH2 |
| 474 | 020E | 6318 | | STAW | ISUML2 |
| 475 | 0210 | 4CE2 | | MOV | A,CR2 ;ADD PWR VAL |
| 476 | 0212 | 74A032 | | ADDNCW | PWRVAL |
| 477 | 0215 | 2033 | | INRW | PWRVAH |
| 478 | 0217 | 6332 | | STAW | PWRVAL |
| 479 | 0219 | 64083F | | ANI | PA,03FH ;INC MUX ADD |
| 480 | 021C | 641880 | | ORI | PA,080H |
| 481 | 021F | 10 | | EXA | |
| 482 | 0220 | AA | | EI | |
| 483 | 0221 | 62 | | RETI | |
| 484 | 0222 | 4CE1 | TIMF03: | MOV | A,CR1 |
| 485 | 0224 | 74A01A | | ADDNCW | ISUML3 ;ADD I PH THREE |
| 486 | 0227 | 201B | | INRW | ISUMH3 |
| 487 | 0229 | 631A | | STAW | ISUML3 |
| 488 | 022B | 6418C0 | | ORI | PA,0C0H ;RESET MUX ADD |
| 489 | 022E | 10 | | EXA | |
| 490 | 022F | AA | | EI | |
| 491 | 0230 | 3056 | | DCRW | TIM07 ;DEC CYC TIMER |
| 492 | 0232 | 62 | | RETI | ;RET IF NOT END OF CYCLE |
| 493 | 0233 | BA | | DI | |
| 494 | 0234 | 10 | | EXA | |
| 495 | 0235 | 11 | | EXX | |
| 496 | 0236 | 690A | | MVI | A,RDFREQ ;RESET CYC COUNTER |
| 497 | 0238 | 51 | | DCR | A |
| 498 | 0239 | 6356 | | STAW | TIM07 |
| 499 | 023B | 24FF00 | | LXI | D,00FFH ;SET MAX VAL |
| 500 | 023E | 3422FF | | LXI | H,GAINSM |
| 501 | 0241 | 4883 | | LDEAX | H |
| 502 | 0243 | 690A | | MVI | A,RDFREQ ;CAL GAIN AVG VAL |
| 503 | 0245 | 483D | | DIV | A |
| 504 | 0247 | 74BE | | DLT | EA,D |
| 505 | 0249 | 44FF00 | | LXI | EA,00FFH |

| | | | | | |
|---|---|---|---|---|---|
| 506 | 024C | 09 | MOV | A,EAL | |
| 507 | 024D | 632C | STAW | AGAINS | |
| 508 | 024F | 440000 | LXI | EA,00 | |
| 509 | 0252 | 4893 | STEAX | H | ;ZERO GAIN TOTAL |
| 510 | 0254 | 3426FF | LXI | H,TIMSUM | ;SET MEN POINTER |
| 511 | 0257 | 4883 | LDEAX | H | |
| 512 | 0259 | 6932 | MVI | A,RFREQ5 | ;CAL TIME ABS VAL |
| 513 | 025B | 483D | DIV | A | |
| 514 | 025D | 74BE | DLT | EA,D | |
| 515 | 025F | 44FF00 | LXI | EA,00FFH | |
| 516 | 0262 | 09 | MOV | A,EAL | |
| 517 | 0263 | 3732 | LTI | A,32H | ;TEST FOR MAX VAL |
| 518 | 0265 | 6932 | MVI | A,32H | |
| 519 | 0267 | 2701 | GTI | A,01H | ;TEST FOR MIN VAL |
| 520 | 0269 | 6901 | MVI | A,01H | |
| 521 | 026B | 6331 | STAW | TIMSET | |
| 522 | 026D | 440000 | LXI | EA,0000 ;ZERO TIME SUM | |
| 523 | 0270 | 4893 | STEAX | H | |
| 524 | 0272 | 3424FF | LXI | H,RTSUM ;CAL RESET TIME | |
| 525 | 0275 | 4883 | LDEAX | H | |
| 526 | 0277 | 690A | MVI | A,RDFREQ | |
| 527 | 0279 | 483D | DIV | A | |
| 528 | 027B | 74BE | DLT | EA,D | |
| 529 | 027D | 44FF00 | LXI | EA,00FFH | |
| 530 | 0280 | 09 | MOV | A,EAL | |
| 531 | 0281 | 443707 | LXI | EA,HTFACT | ;CAL HEAT LOSS |
| 532 | 0284 | 483D | DIV | A | |
| 533 | 0286 | 74BE | DLT | EA,D | |
| 534 | 0288 | 44FF00 | LXI | EA,00FFH | |
| 535 | 028B | 09 | MOV | A,EAL | |
| 536 | 028C | 2707 | GTI | A,07H | ;TEST FOR MAX TIME |
| 537 | 028E | 6907 | MVI | A,07H | |
| 538 | 0290 | 37B8 | LTI | A,0B8H | ;TEST FOR MIN TIME |
| 539 | 0292 | 69B8 | MVI | A,0B8H | |
| 540 | 0294 | 632F | STAW | HTLOSS | |
| 541 | 0296 | 440000 | LXI | EA,0000 | |
| 542 | 0299 | 4893 | STEAX | H | ;ZERO RESET TIME |
| 543 | 029B | 3432FF | LXI | H,PWRVAA | ;SET MEM POINTER |
| 544 | 029E | 4883 | LDEAX | H | |
| 545 | 02A0 | 690A | MVI | A,RDFREQ | ;LOAD LINE PWR VAL |
| 546 | 02A2 | 483D | DIV | A | ;FIND AVG |
| 547 | 02A4 | 74BE | DLT | EA,D | |
| 548 | 02A6 | 44FF00 | LXI | EA,00FFH | |
| 549 | 02A9 | 09 | MOV | A,EAL | |
| 550 | 02AA | 6334 | STAW | PWRAVG | |

| | | | | | | |
|---|---|---|---|---|---|---|
| 551 | 02AC | 440000 | LXI | EA,0000 | | |
| 552 | 02AF | 4893 | STEAX | H | ;ZERO LINE PWR VAL | |
| 553 | 02B1 | 3416FF | LXI | H,ISUM1 | ;SET MEM POINTER | |
| 554 | 02B4 | 4883 | LDEAX | H | | |
| 555 | 02B6 | 690A | MVI | A,RDFREQ | ;LOAD I PH ONE | |
| 556 | 02B8 | 483D | DIV | A | ;FIND AVG | |
| 557 | 02BA | 74BE | DLT | EA,D | | |
| 558 | 02BC | 44FF00 | LXI | EA,00FFH | | |
| 559 | 02BF | 09 | MOV | A,EAL | | |
| 560 | 02C0 | 630C | STAW | IAVGP1 | | |
| 561 | 02C2 | 440000 | LXI | EA,0000 | | |
| 562 | 02C5 | 4893 | STEAX | H | ;ZERO I PH ONE | |
| 563 | 02C7 | 3418FF | LXI | H,ISUM2 | | |
| 564 | 02CA | 4883 | LDEAX | H | ;LOAD PH 2 SUM | |
| 565 | 02CC | 690A | MVI | A,RDFREQ | | |
| 566 | 02CE | 483D | DIV | A | | |
| 567 | 02D0 | 74BE | DLT | EA,D | | |
| 568 | 02D2 | 44FF00 | LXI | EA,00FFH | | |
| 569 | 02D5 | 09 | MOV | A,EAL | | |
| 570 | 02D6 | 630D | STAW | IAVGP2 | | |
| 571 | 02D8 | 440000 | LXI | EA,0000 | | |
| 572 | 02DB | 4893 | STEAX | H | ;ZERO I PH TWO | |
| 573 | 02DD | 341AFF | LXI | H,ISUM3 | | |
| 574 | 02E0 | 4883 | LDEAX | H | ;LOAD PH 3 SUM | |
| 575 | 02E2 | 690A | MVI | A,RDFREQ | | |
| 576 | 02E4 | 483D | DIV | A | | |
| 577 | 02E6 | 74BE | DLT | EA,D | | |
| 578 | 02E8 | 44FF00 | LXI | EA,00FFH | | |
| 579 | 02EB | 09 | MOV | A,EAL | | |
| 580 | 02EC | 630E | STAW | IAVGP3 | | |
| 581 | 02EE | 440000 | LXI | EA,0000 | | |
| 582 | 02F1 | 4893 | STEAX | H | | |
| 583 | 02F3 | 010C | LDAW | IAVGP1 | | |
| 584 | 02F5 | 74A80D | GTAW | IAVGP2 | ;FIND LAR VAL | |
| 585 | 02F8 | 010D | LDAW | IAVGP2 | | |
| 586 | 02FA | 74A80E | GTAW | IAVGP3 | ;TEST THIRD VAL | |
| 587 | 02FD | 010E | LDAW | IAVGP3 | | |
| 588 | 02FF | 630B | STAW | IAVGHI | ;SAVE LAR VAL | |
| 589 | 0301 | 010C | LDAW | IAVGP1 | ;LOAD FIRST VAL | |
| 590 | 0303 | 74B80D | LTAW | IAVGP2 | ;FIND LOWEST VAL | |
| 591 | 0306 | 010D | LDAW | IAVGP2 | | |
| 592 | 0308 | 74B80E | LTAW | IAVGP3 | ;TEST THIRD VAL | |
| 593 | 030B | 010E | LDAW | IAVGP3 | | |
| 594 | 030D | 6309 | STAW | IAVGLO | ;SAVE LOWEST VAL | |
| 595 | 030F | 010C | LDAW | IAVGP1 | ;RELOAD FIRST VAL | |
| 596 | 0311 | 74E80B | NEAW | IAVGHI | ;TEST WITH HIGH VAL | |

| | | | | | |
|---|---|---|---|---|---|
| 597 | 0314 | 010D | | LDAW | IAVGP2 | ;LOAD SECOND VAL IF EQUA |
| 598 | 0316 | 74E809 | | NEAW | IAVGLO | ;TEST WITH LOW VAL |
| 599 | 0319 | 010D | | LDAW | IAVGP2 | ;LOAD IF EQUAL |
| 600 | 031B | 74E80C | | NEAW | IAVGP1 | |
| 601 | 031E | CC | | GJMP | TIMF04 | ;JMP IF A MID VAL |
| 602 | 031F | 010D | | LDAW | IAVGP2 | ;LOAD SECOND VAL |
| 603 | 0321 | 74E80B | | NEAW | IAVGHI | ;TEST WITH HIGH VAL |
| 604 | 0324 | 010E | | LDAW | IAVGP3 | ;LOAD IF EQUAL |
| 605 | 0326 | 74E809 | | NEAW | IAVGLO | ;TEST WITH LOW VAL |
| 606 | 0329 | 010E | | LDAW | IAVGP3 | |
| 607 | 032B | 630A | TIMF04: | STAW | IAVGMD | ;SAVE MID VAL |
| 608 | 032D | 150202 | | ORIW | TMFLAG,02H | ;SET CYCLE BIT |
| 609 | 0330 | 10 | | EXA | | |
| 610 | 0331 | 11 | | EXX | | |
| 611 | 0332 | AA | | EI | | |
| 612 | 0333 | 150280 | | ORIW | TMFLAG,080H | ;SET 0.02 SEC BITS |
| 613 | 0336 | 5800 | | BIT | 0,STIND1 | |
| 614 | 0338 | 4E26 | | GJMP | TIMF07 | ;JMP IF NOT RUNNING |
| 615 | 033A | 550208 | | OFFIW | TMFLAG,08H | |
| 616 | 033D | C4 | | GJMP | TIMF05 | ;JUMP IF ACCEL |
| 617 | 033E | 644B40 | | ONI | PD,040H ;TEST FOR PH LOSS OPT | |
| 618 | 0341 | DE | | GJMP | TIMF07 | ;JMP IF NOT USED |
| 619 | 0342 | 35090A | TIMF05: | LTIW | IAVGLO,IMIN | ;TEST FOR LINE LOSS |
| 620 | 0345 | CC | | GJMP | TIMF06 | ;JMP IF OK |
| 621 | 0346 | 150340 | | ORIW | FLTST1,040H | ;SET IMP TRIP |
| 622 | 0349 | 3054 | | DCRW | TIM05 | |
| 623 | 034B | D4 | | GJMP | TIMF07 | |
| 624 | 034C | 150340 | | ORIW | FLTST1,040H | |
| 625 | 034F | 547505 | | GJMP | TRIPOV | |
| 626 | 0352 | 0503BF | TIMF06: | ANIW | FLTST1,0BFH | ;RESET IMP TRIP |
| 627 | 0355 | 255402 | | GTIW | TIM05,LINDLY | |
| 628 | 0358 | 2054 | | INRW | TIM05 | |
| 629 | 035A | 355402 | | LTIW | TIM05,LINDLY | |
| 630 | 035D | 715402 | | MVIW | TIM05,LINDLY | |
| 631 | 0360 | BA | TIMF07: | DI | | |
| 632 | 0361 | 010B | | LDAW | IAVGHI | ;LOAD HIGH I |
| 633 | 0363 | 1A | | MOV | B,A | ;STORE IN B |
| 634 | 0364 | 482E | | MUL | B | ;CAL I SQ |
| 635 | 0366 | 702F06FF | | LDED | ITOTLA | ;LOAD ITOTL IN BC |
| 636 | 036A | 14A208 | | LXI | B,IRUN | ;LOAD NORMAL I SQ |
| 637 | 036D | 74B5 | | DSUBNB | EA,B | ;SUB I NORMAL SQ |
| 638 | 036F | 4E36 | | GJMP | TIMF08 | ;JMP IF IRUN > I SQ |
| 639 | 0371 | 0131 | | LDAW | TIMSET | ;LOAD TRIP TIME |
| 640 | 0373 | 483D | | DIV | A | ;DIV I SQ BY TIME SETTI |
| 641 | 0375 | 690A | | MVI | A,0AH | |
| 642 | 0377 | 7041 | | EADD | EA,A | ;ADD DIFF AND TIME FAC? |
| 643 | 0379 | 74A6 | | DADDNC | EA,D | ;ADD ITOTL TO I SQ |
| 644 | 037B | 2008 | | INRW | ITOTH | ;INC ITOTH IF CARRY |

```
645  037D  3406FF         LXI     H,ITOTLA       ;SET MEN P
646  0380  4893           STEAX   H              ;STORE NEW ITOTL VAL
647  0382  3508FD         LTIW    ITOTH,0FDH     ;TEST FOR MAX VAL
648  0385  7108FD         MVIW    ITOTH,0FDH
649  0388  150301         ORIW    FLTST1,01      ;SET FAULT IND
650  038B  550008         OFFIW   STIND1,08H
651  038E  4E8F           GJMP    TIMF12         ;JMP IF TRIPPED
652  0390  701F06FF       LBCD    ITOTLA         ;LOAD I TOTAL LOW 16 BITS
653  0394  445044         LXI     EA,ITOTML      ;LOAD MAX ITOT
654  0397  692A           MVI     A,ITOTMH
655  0399  706C08FF       MOV     D,ITOTHA       ;LOAD ITOTH
656  039D  74B5           DSUBNB  EA,B           ;SUB ITOTL FORM ITOTML
657  039F  51             DCR     A              ;SUB BORROW BIT
658  03A0  60B4           SUBNB   A,D            ;SUB ITOTH FROM ITOTMH
659  03A2  547505         GJMP    TRIPOV         ;TRIP OVLOAD IF BORROW
660  03A5  4E78           GJMP    TIMF12         ;JMP FOR RETURN
661                       ;
662  03A7  5800   TIMF08: BIT     0,STIND1
663  03A9  4E42           GJMP    TIMF09         ;JMP IF STOPPED
664  03AB  0503FE         ANIW    FLTST1,0FEH    ;RESET IMP TRIP
665  03AE  147408         LXI     B,IM040 ;40% FLA HEAT FACTOR
666  03B1  350B10         LTIW    IAVGHI,FLA040  ;40% LOAD
667  03B4  14910A         LXI     B,IM050 ;60% HF
668  03B7  350B14         LTIW    IAVGHI,FLA050  ;50% LOAD
669  03BA  14AE0C         LXI     B,IM060 ;60% HF
670  03BD  350B18         LTIW    IAVGHI,FLA060  ;60% LOAD
671  03C0  14CB0E         LXI     B,IM070 ;70% HF
672  03C3  350B1C         LTIW    IAVGHI,FLA070  ;70% LOAD
673  03C6  14E810         LXI     B,IM080 ;80% HF
674  03C9  350B20         LTIW    IAVGHI,FLA080  ;80% LOAD
675  03CC  140513         LXI     B,IM090 ;90% HF
676  03CF  350B24         LTIW    IAVGHI,FLA090  ;90% LOAD
677  03D2  142215         LXI     B,IM100 ;100% HF
678  03D5  350B28         LTIW    IAVGHI,FLA100  ;100% LOAD
679  03D8  145C19         LXI     B,IM120 ;120% HF
680  03DB  3407FF         LXI     H,ITOTMA
681  03DE  4883           LDEAX   H              ;LOAD I TOTAL HIGH 16 BITS
682  03E0  74AD           DGT     EA,B           ;TEST FOR MIN
683  03E2  A8             INX     EA
684  03E3  74AD           DGT     EA,B
685  03E5  A8             INX     EA
686  03E6  74BD           DLT     EA,B           ;TEST FOR MAX
687  03E8  A9             DCX     EA
688  03E9  4893           STEAX   H              ;STORE NEW I TOTAL
689  03EB  4E32           GJMP    TIMF12
690                       ;
```

```
691 03ED  0106         TIMF09:LDAW   ITOTL           ;LOAD HEAT LOSS VAL
692 03EF  74B02F              SUBNBW  HTLOSS          ;SUB VAL FROM ITOT
693 03F2  C3                  GJMP    TIMF10
694 03F3  6306                STAW    ITOTL
695 03F5  D4                  GJMP    TIMF11          ;JMP IF OK
696 03F6  6306         TIMF10:STAW   ITOTL
697 03F8  3007                DCRW    ITOTM           ;DEC ITOT MID
698 03FA  CF                  GJMP    TIMF11          ;JMP IF OK
699 03FB  3008                DCRW    ITOTH           ;DEC ITOT HIGH
700 03FD  CC                  GJMP    TIMF11          ;JMP IF OK
701 03FE  150040              ORIW    STIND1,040H     ;RESET ZERO START
702 0401  710800              MVIW    ITOTH,00        ;ZERO ITOT
703 0404  710700              MVIW    ITOTM,00
704 0407  710600              MVIW    ITOTL,00
705 040A  3407FF       TIMF11:LXI    H,ITOTMA
706 040D  4883                LDEAX   H               ;LOAD ITOT HIGH BITS
707 040F  702F2AFF            LDED    TRSETV
708 0413  74EE                DNE     EA,D            ;TEST FOR MIN TO RESET
709 0415  C9                  GJMP    TIMF12          ;JMP IF NO RESET
710 0416  74BE                DLT     EA,D
711 0418  C6                  GJMP    TIMF12          ;JMP IF NO RESET
712 0419  550008              OFFIW   STIND1,08H      ;TEST FOR TRIP
713 041C  407701              CALL    OVRSET          ;RESET IF TRIPED
714                   ;
715 041F  AA           TIMF12:EI
716 0420  645D80              OFFI    PF,080H   ;0.02 SEC F/F WD
717 0423  C4                  GJMP    TIMF13
718 0424  641D80              ORI     PF,080H
719 0427  C3                  GJMP    TIMF14
720 0428  640D7F       TIMF13:ANI    PF,07FH
721 042B  353458       TIMF14:LTIW   PWRAVG,058H     ;TEST FOR PWR OFF
722 042E  C9                  GJMP    TIMFT1          ;JMP IF ON
723 042F  305A                DCRW    TIM11
724 0431  D1                  GJMP    TIMFT2
725 0432  150304              ORIW    FLTST1,04H      ;SET FAULT IND
726 0435  54B201              GJMP    PWROFF          ;TURNOFF RELAY
727 0438  255A02       TIMFT1:GTIW   TIM11,02H       ;TEST FOR MAX VAL
728 043B  205A                INRW    TIM11           ;INC IF UNDER
729 043D  355A03              LTIW    TIM11,03H
730 0440  715A02              MVIW    TIM11,02H       ;SET IF HIGH
731 0443  5B00         TIMFT2:BIT    3,STIND1
732 0445  C3                  GJMP    TIMF15          ;JMP IF NOT TRIPPED
733 0446  407701              CALL    OVRSET          ;RESET RELAY
734 0449  5800         TIMF15:BIT    0,STIND1        ;TEST FOR RUNING
735 044B  4E70                GJMP    TIMF21          ;JMP IF STOPPED
736 044D  550208              OFFIW   TMFLAG,08H      ;TEST FOR ACCEL
737 0450  4E6B                GJMP    TIMF21          ;JMP IF ACCEL
```

| | | | | | |
|---|---|---|---|---|---|
| 738 0452 | BA | | DI | | |
| 739 0453 | 4CC3 | | MOV | A,PD | |
| 740 0455 | 0718 | | ANI | A,018H | ;TEST FOR JAM OPT |
| 741 0457 | 6700 | | NEI | A,00 | |
| 742 0459 | 4E35 | | GJMP | TIMF18 | ;JMP IF NOT USED |
| 743 045B | 4CC3 | | MOV | A,PD | |
| 744 045D | 0718 | | ANI | A,018H | ;STRIP JAM OPT VAL |
| 745 045F | 1A | | MOV | B,A | |
| 746 0460 | 69F0 | | MVI | A,0F0H | ;SET DEFAULT VAL |
| 747 0462 | 746A08 | | NEI | B,008H | ;TEST FOR 108 % |
| 748 0465 | 692B | | MVI | A,FLA108 | |
| 749 0467 | 746A10 | | NEI | B,010H | ;TEST FOR 125 % |
| 750 046A | 6932 | | MVI | A,FLA125 | |
| 751 046C | 746A18 | | NEI | B,018H | ;TEST FOR 200 % |
| 752 046F | 6950 | | MVI | A,FLA200 | |
| 753 0471 | 74B80B | | LTAW | IAVGHI | ;TEST FOR MAX VAL |
| 754 0474 | CC | | GJMP | TIMF17 | ;JMP IF OK |
| 755 0475 | 150310 | | ORIW | FLTST1,010H | |
| 756 0478 | 3052 | | DCRW | TIM03 | ;DEC COUNTER |
| 757 047A | 4E41 | | GJMP | TIMF21 | ;JMP IF UNDER |
| 758 047C | 150310 | | ORIW | FLTST1,010H | ;SAVE FAULT IND |
| 759 047F | 4EF4 | | GJMP | TRIPOV | |
| 760 0481 | 0503EF | TIMF17: | ANIW | FLTST1,0EFH | ;RESET IMPENDING TRIP |
| 761 0484 | 012E | | LDAW | JAMDLY | ;LOAD MAX COUNTER VAL |
| 762 0486 | 74B852 | | LTAW | TIM03 | ;TEST WITH COUNTER |
| 763 0489 | 2052 | | INRW | TIM03 | ;INC IF UNDER |
| 764 048B | 74A852 | | GTAW | TIM03 | ;TEST MAX VAL |
| 765 048E | 6352 | | STAW | TIM03 | ;SET MAX VAL |
| 766 0490 | 644B02 | TIMF18: | ONI | PD,02H | ;TEST FOR UNDER I OPT |
| 767 0493 | 4E22 | | GJMP | TIMF20 | ;JMP IF NOT USED |
| 768 0495 | 35091C | | LTIW | IAVGLO,FLA070 | |
| 769 0498 | CF | | GJMP | TIMF19 | ;JMP IF OK |
| 770 0499 | 25090A | | GTIW | IAVGLO,IMIN | ;TEST FOR STOP |
| 771 049C | CB | | GJMP | TIMF19 | ;JMP IF LINE OFF |
| 772 049D | 150308 | | ORIW | FLTST1,08H | ;SET FAULT IND |
| 773 04A0 | 3059 | | DCRW | TIM10 | |
| 774 04A2 | D4 | | GJMP | TIMF20 | |
| 775 04A3 | 150308 | | ORIW | FLTST1,08H | ;SET FAULT IND |
| 776 04A6 | 4ECD | | GJMP | TRIPOV | |
| 777 04A8 | 0503F7 | TIMF19: | ANIW | FLTST1,0F7H | ;RESET IMPENDING TRIP |
| 778 04AB | 012D | | LDAW | UNLDLY | ;LOAD MAX COUNTER VALUE |
| 779 04AD | 74B859 | | LTAW | TIM10 | ;TEST COUNTER VAL |
| 780 04B0 | 2059 | | INRW | TIM10 | ;INC IF UNDER |
| 781 04B2 | 74A859 | | GTAW | TIM10 | |
| 782 04B5 | 6359 | | STAW | TIM10 | |
| 783 04B7 | 645B80 | TIMF20: | OFFI | PD,080H ;TEST PH BAL OP | |
| 784 04BA | 402201 | | CALL | IUNBAL | ;CALL IF USED |
| 785 04BD | AA | TIMF21: | EI | | |

| | | | | | |
|---|---|---|---|---|---|
| 786 04BE | 3051 | | DCRW | TIM02 | ;DEC .5 SEC COUNTER |
| 787 04C0 | 62 | | RETI | | ;RET IF UNDER |
| 788 04C1 | 715118 | | MVIW | TIM02,018H | ;RESET .5 SEC COUNTER |
| 789 04C4 | 0502FB | | ANIW | TMFLAG,0FBH | ;SET .5 SEC FLAG |
| 790 04C7 | 550008 | TIMF23:OFFIW | | STIND1,08H | ;TEST FOR TRIP |
| 791 04CA | 4E9A | | GJMP | TIMF29 | ;JMP IF TRIPPED |
| 792 04CC | 5800 | | BIT | 0,STIND1 | |
| 793 04CE | 62 | | RETI | | ;RET IF STOPPED |
| 794 04CF | 650300 | | NEIW | FLTST1,00 | ;TEST FOR IMP TRIP |
| 795 04D2 | C8 | | GJMP | TIMF24 | ;JMP IF NOT REQ |
| 796 04D3 | 645D40 | | OFFI | PF,040H | |
| 797 04D6 | C4 | | GJMP | TIMF24 | |
| 798 04D7 | 641D40 | | ORI | PF,040H | ;TURN ON TRIP LED |
| 799 04DA | C3 | | GJMP | TIMF25 | |
| 800 04DB | 640DBF | TIMF24:ANI | | PF,0BFH | ;TURN OFF TRIP LED |
| 801 04DE | 5B02 | TIMF25:BIT | | 3,TMFLAG | ;TEST FOR ACCEL |
| 802 04E0 | 62 | | RETI | | ;RET IF UP TO SPEED |
| 803 04E1 | BA | | DI | | |
| 804 04E2 | 450210 | | ONIW | TMFLAG,10H | ;SKIP IF ACCELERATING |
| 805 04E5 | CA | | GJMP | TIMFC1 | |
| 806 04E6 | 6928 | | MVI | A,FLA100 | |
| 807 04E8 | 74A80B | | GTAW | IAVGHI | ;SKIP IF < 100% FLA |
| 808 04EB | 0502EF | | ANIW | TMFLAG,0EFH | |
| 809 04EE | 4E5B | | GJMP | TIMFC2 | |
| 810 04F0 | 6928 | TIMFC1:MVI | | A,FLA100 | |
| 811 04F2 | 74A80B | | GTAW | IAVGHI | ;TEST FOR UP TO SPEED |
| 812 04F5 | 4E56 | | GJMP | TIMF26 | ;JMP IF HIGH |
| 813 04F7 | 3058 | | DCRW | TIM09 | ;DEC UP TO SPEED COUNTER |
| 814 04F9 | 4E50 | | GJMP | TIMFC2 | |
| 815 04FB | 715402 | | MVIW | TIM05,LNDLY | ;PRESET DELAY COUNTERS |
| 816 04FE | 71532D | | MVIW | TIM04,UNLDLY | |
| 817 0501 | 645B20 | | OFFI | PD,020H | ;TEST FOR DELAY |
| 818 0504 | 712E63 | | MVIW | JAMDLY,063H | ;SET FOR 2 SEC |
| 819 0507 | 644B20 | | ONI | PD,020H | |
| 820 050A | 712E02 | | MVIW | JAMDLY,02H | ;SET MIN DELAY |
| 821 050D | 012E | | LDAW | JAMDLY | |
| 822 050F | 6352 | | STAW | TIM03 | |
| 823 0511 | 645B04 | | OFFI | PD,04H | ;TEST FOR DELAY |
| 824 0514 | 712D64 | | MVIW | UNLDLY,064H | ;SET FOR 2 SEC |
| 825 0517 | 644B04 | | ONI | PD,04H | |
| 826 051A | 712D02 | | MVIW | UNLDLY,02H | ;SET FOR MIN |
| 827 051D | 012D | | LDAW | UNLDLY | |
| 828 051F | 6359 | | STAW | TIM10 | |
| 829 0521 | 715801 | | MVIW | TIM09,01 | |
| 830 0524 | 0502F7 | | ANIW | TMFLAG,0F7H | ;RESET ACCEL BIT |
| 831 0527 | 5E00 | | BIT | 6,STIND1 | ;TEST FOR ZERO START |

```
832 0529  4E20              GJMP    TIMFC2          ;RET IF NOT ZERO
833 052B  3407FF            LXI     H,ITOTMA
834 052E  4883              LDEAX   H
835 0530  3428FF            LXI     H,TSTVAL
836 0533  4893              STEAX   H               ;STORE NEW THERMAL START VAL
837 0535  0500BF            ANIW    STIND1,0BFH     ;RESET ZERO START STATUS
838 0538  140002            LXI     B,00200H        ;ADD SAFTEY MARGIN
839 053B  74C5              DADD    EA,B
840 053D  B5                DMOV    B,EA
841 053E  44442A            LXI     EA,ITOTMM       ;LOAD HIGH 16 BIT I TOTAL
842 0541  74B5              DSUBNB  EA,B            ;SUB START VAL
843 0543  440000            LXI     EA,0000H        ;ZERO IF LESS THAN ZREO
844 0546  342AFF            LXI     H,TRSETV
845 0549  4893              STEAX   H               ;SAVE NEW RESET VAL
846 054B  AA        TIMFC2: EI
847 054C  62                RETI
848 054D  255800    TIMF26: GTIW    TIM09,00H
849 0550  2058              INRW    TIM09
850 0552  AA                EI
851 0553  62                RETI
852 0554  3055      TIMF27: DCRW    TIM06           ;DEC SETUP TIMER
853 0556  62                RETI
854 0557  715527            MVIW    TIM06,27H       ;RESET SETUP TIMER
855 055A  645D80            OFFI    PF,080H         ;WATCHDOG F/F
856 055D  C4                GJMP    TIMF28
857 055E  641D80            ORI     PF,080H
858 0561  62                RETI
859 0562  640D7F    TIMF28: ANI     PF,07FH
860 0565  62                RETI
861 0566  5A00      TIMF29: BIT     2,STIND1        ;TEST SYS READY
862 0568  C8                GJMP    TIMF30          ;JMP IF READY
863 0569  644D10            ONI     PF,010H
864 056C  C4                GJMP    TIMF30
865 056D  640DEF            ANI     PF,0EFH         ;TURNOFF SYS READY LED
866 0570  62                RETI
867 0571  641D10    TIMF30: ORI     PF,010H         ;TURNON SYS READY LED
868 0574  62                RETI
869                         ;
870                         ;
871                         ;
872                         ;       TRIP OVERLOAD SUB
873 0575  15000C    TRIPOV: ORIW    STIND1,0CH      ;SET TRIP BIT
874 0578  0500FE            ANIW    STIND1,0FEH     ;RESET RUN BIT
875 057B  641D40            ORI     PF,040H         ;TURNON TRIP LED
```

```
876 057E  640DF7.          ANI     PF,0F7H      ;TURNOFF RELAY
877 0581  040000           LXI     SP,0000H     ;RESET SP
878 0584  541307           GJMP    STAR6
879                   ;
880                   ;    ,
881                   ;
882 0587  040000   RESET:  LXI     SP,0000H     ;INTIALIZE STACK POINTER
883 058A  440000           LXI     EA,0000H     ;ZERO EA
884 058D  140000           LXI     B,0000H ;       BC
885 0590  240000           LXI     D,0000H ;       DE
886 0593  340000           LXI     H,0000H ;       HL
887 0596  68FF             MVI     V,0FFH       ;SET WORKING REG
888 0598  10               EXA
889 0599  11               EXX
890 059A  440000           LXI     EA,0000
891 059D  140000           LXI     B,0000H ;ZERO ALT REG
892 05A0  240000           LXI     D,0000H
893 05A3  68FF             MVI     V,0FFH       ;SET WORKING REG
894 05A5  6948             MVI     A,048H
895 05A7  4DD0             MOV     MM,A         ;SET MEN REG FOR 78C11
896 05A9  691F             MVI     A,01FH
897 05AB  4DD2             MOV     MA,A         ;SET PORT A TO I/O
898 05AD  640020           MVI     PA,020H ;DISABLE TEST CKT
899 05B0  6903             MVI     A,003H
900 05B2  4DD1             MOV     MCC,A        ;SET PORT C TO CONTROL
901 05B4  6900             MVI     A,00H        ;AND OUTPUT
902 05B6  4DD4             MOV     MC,A
903 05B8  640200           MVI     PC,00H
904 05BB  69FF             MVI     A,0FFH
905 05BD  4DD3             MOV     MB,A         ;SET PORT B TO INPUT
906 05BF  640100           MVI     PB,00H
907 05C2  6900             MVI     A,00H
908 05C4  4DD7             MOV     MF,A         ;SET PORT F TO OUTPUT
909 05C6  640580           MVI     PF,080H ;RESET WATCHDOG
910 05C9  6900             MVI     A,00
911 05CB  6360             STAW    TSTOR1       ;TEMPORARY STOR LOC 1
912 05CD  6361             STAW    TSTOR2       ;                   2
913 05CF  6362             STAW    TSTOR3       ;                   3
914 05D1  6363             STAW    TSTOR4       ;                   4
915 05D3  6364             STAW    TSTOR5       ;                   5
916 05D5  6365             STAW    TSTOR6       ;                   6
917 05D7  6366             STAW    TSTOR7       ;                   7
918 05D9  6367             STAW    TSTOR8       ;                   8
919 05DB  71020C           MVIW    TMFLAG,0CH   ;SET TIME FLAG BITS
920 05DE  715041.          MVIW    TIM01,41H    ;SET ..1 SEC COUNTER
```

| | | | | | | |
|---|---|---|---|---|---|---|
| 921 | 05E1 | 715131 | | MVIW | TIM02,31H | |
| 922 | 05E4 | 715201 | | MVIW | TIM03,01H | |
| 923 | 05E7 | 715301 | | MVIW | TIM04,01H | |
| 924 | 05EA | 715401 | | MVIW | TIM05,01H | |
| 925 | 05ED | 715580 | | MVIW | TIM06,80H | |
| 926 | 05F0 | 715705 | | MVIW | TIM08,05H | |
| 927 | 05F3 | 715801 | | MVIW | TIM09,01H | |
| 928 | 05F6 | 715901 | | MVIW | TIM10,01H | |
| 929 | 05F9 | 715A02 | | MVIW | TIM11,02H | |
| 930 | 05FC | 715C20 | | MVIW | TIM13,20H | |
| 931 | | | | | | |
| 932 | 05FF | 4854 | | SKIT | SB | |
| 933 | 0601 | 4E6E | | GJMP | RESET3 | ;JMP IF NO PWR UP |
| 934 | | | | | | |
| 935 | 0603 | 710300 | | MVIW | FLTST1,00 | ;RESET FAULT & IND |
| 936 | 0606 | 7100D2 | | MVIW | STIND1,0D2H | ;RESET STATUS INDS |
| 937 | 0609 | 710800 | | MVIW | ITOTH,00H | ;RESET ITOT |
| 938 | 060C | 710700 | | MVIW | ITOTM,00H | |
| 939 | 060F | 710600 | | MVIW | ITOTL,00H | |
| 940 | 0612 | 712200 | | MVIW | GAINSL,00 | ;RESET GAIN |
| 941 | 0615 | 712300 | | MVIW | GAINSH,00 | |
| 942 | 0618 | 712400 | | MVIW | RTSUML,00 | ;RESET RESET TIME |
| 943 | 061B | 712500 | | MVIW | RTSUMH,00 | |
| 944 | 061E | 712600 | | MVIW | TMSUML,00 | ;RESET TRIP TIME |
| 945 | 0621 | 712700 | | MVIW | TMSUMH,00 | |
| 946 | 0624 | 713101 | | MVIW | TIMSET,01 | ;SET TEMP TRIP VAL |
| 947 | 0627 | 690A | | MVI | A,RDFREQ | |
| 948 | 0629 | 51 | | DCR | A | |
| 949 | 062A | 6356 | | STAW | TIM07 | |
| 950 | 062C | 446400 | | LXI | EA,0100 | ;SET RESET THEMAL VAL |
| 951 | 062F | 342AFF | | LXI | H,TRSETV | |
| 952 | 0632 | 4893 | | STEAX | H | |
| 953 | 0634 | 44442A | | LXI | EA,ITOTMM | ;SET THERMAL START VAL |
| 954 | 0637 | 3428FF | | LXI | H,TSTVAL | |
| 955 | 063A | 4893 | | STEAX | H | |
| 956 | | | | | | |
| 957 | 063C | 644801 | | ONI | PA,01H | |
| 958 | 063F | 4E30 | | GJMP | RESET3 | ;JMP IF PWR OFF CKT NOT USED |
| 959 | 0641 | 6407FF | | MVI | MKL,0FFH | ;MASK INT |
| 960 | 0644 | 6406FE | | MVI | MKH,0FEH | ;ENABLE A-D INT |
| 961 | 0647 | 648009 | | MVI | ANM,09H | ;ENABLE PWR OFF CAP VAL |
| 962 | 064A | 0502DF | | ANIW | TMFLAG,0DFH | ;RESET A-D BIT |
| 963 | 064D | AA | RESET1:EI | | | |
| 964 | 064E | 5D02 | | BIT | 5,TMFLAG | |
| 965 | 0650 | FC | | GJMP | RESET1 | ;WAIT FOR A-D |
| 966 | 0651 | 0502DF | | ANIW | TMFLAG,0DFH | ;RESET A-D BIT |
| 967 | 0654 | AA | RESET2:EI | | | |

| | | | | | | |
|---|---|---|---|---|---|---|
| 968 | 0655 | 5D02 | | BIT | 5,TMFLAG | |
| 969 | 0657 | FC | | GJMP | RESET2 | ;WAIT FOR SECOND A-D |
| 970 | 0658 | BA | | DI | | |
| 971 | 0659 | 40C300 | | CALL | ADREAD | |
| 972 | 065C | 274D | | GTI | A,04DH | ;TEST FOR FAULT |
| 973 | 065E | D2 | | GJMP | RESET3 | ;JMP IF NO FAULT |
| 974 | 065F | 710301 | | MVIW | FLTST1,01H | ;SET FAULT IND |
| 975 | 0662 | 15000C | | ORIW | STIND1,0CH | ;TRIP OVERLOAD |
| 976 | 0665 | 0500FE | | ANIW | STIND1,0FEH | ;RESET RUN BIT |
| 977 | 0668 | 6A2F | | MVI | B,2FH | ;CAL I LEVEL |
| 978 | 066A | 482E | | MUL | B | |
| 979 | 066C | 3407FF | | LXI | H,ITOTMA | |
| 980 | 066F | 4893 | | STEAX | H | ;STORE NEW ITOT |
| 981 | 0671 | 6407FD | RESET3:MVI | MKL,0FDH | | ;SET INT REG |
| 982 | 0674 | 6406F5 | | MVI | MKH,0F5H | |
| 983 | 0677 | 648000 | | MVI | ANM,00H | ;SET A-D REG |
| 984 | 067A | 34C000 | | LXI | H,DATA01 | |
| 985 | 067D | 2D | | LDAX | H+ | ;LOAD TIMER REG FOR 500 USEC |
| 986 | 067E | 4DDA | | MOV | TM0,A | |
| 987 | 0680 | 2D | | LDAX | H+ | |
| 988 | 0681 | 4DDB | | MOV | TM1,A | |
| 989 | 0683 | 2D | | LDAX | H+ | |
| 990 | 0684 | 4DCD | | MOV | TMM,A | ;START TIMER |
| 991 | 0686 | 450008 | | ONIW | STIND1,008H | ;TEST FOR FAULT |
| 992 | 0689 | 641D18 | | ORI | PF,018H | ;RESET TIMER & SYS LED |
| 993 | | | ; | | | |
| 994 | 068C | AA | START: | EI | | |
| 995 | 068D | 550008 | | OFFIW | STIND1,08H | ;TEST FOR TRIP |
| 996 | 0690 | 4E81 | | GJMP | STAR6 | ;JMP IF TRIPPED |
| 997 | 0692 | 5902 | STAR1: | BIT | 1,TMFLAG | ;TEST FOR CYCLE UPDATE |
| 998 | 0694 | D7 | | GJMP | STAR3 | |
| 999 | 0695 | 0502FD | | ANIW | TMFLAG,0FDH | ;RESET CYCLE BIT |
| 1000 | 0698 | 305B | | DCRW | TIM12 | ;DEC RUN/STOP COUNTER |
| 1001 | 069A | D1 | | GJMP | STAR3 | ;JMP IF NOT ZERO |
| 1002 | 069B | 715B02 | | MVIW | TIM12,SSTDLY | |
| 1003 | 069E | BA | | DI | | |
| 1004 | 069F | 010B | | LDAW | IAVGHI | |
| 1005 | 06A1 | 270A | | GTI | A,IMIN | ;TEST FOR MIN I RUN |
| 1006 | 06A3 | C5 | | GJMP | STAR2 | |
| 1007 | 06A4 | AA | | EI | | |
| 1008 | 06A5 | 150001 | | ORIW | STIND1,01H | ;SET RUN BIT |
| 1009 | 06A8 | C3 | | GJMP | STAR3 | |
| 1010 | 06A9 | 0500FE | STAR2: | ANIW | STIND1,0FEH | ;RESET RUN BIT |
| 1011 | 06AC | 550001 | STAR3: | OFFIW | STIND1,01 | ;TEST FOR RUN |
| 1012 | 06AF | 4FDB | | GJMP | START | ;LOOP IF RUNNING |
| 1013 | 06B1 | 710300 | | MVIW | FLTST1,00 | ;RESET FAULT IND |

| | | | | | |
|---|---|---|---|---|---|
| 1014 | 06B4 | 640DBF | | ANI | PF,0BFH ;TURNOFF TRIP LED |
| 1015 | 06B7 | 641D18 | | ORI | PF,018H ;RESET RELAY & SYS LED |
| 1016 | 06BA | 150218 | | ORIW | TMFLAG,18H ;RESET ACCEL BIT |
| 1017 | 06BD | 645810 | | OFFI | PA,010H ;TEST SETUP |
| 1018 | 06C0 | 4E23 | | GJMP | STAR4 ;JMP IF REQ |
| 1019 | 06C2 | 255580 | | GTIW | TIM06,080H ;TEST SETUP TIMER |
| 1020 | 06C5 | 2055 | | INRW | TIM06 ;INC IF LOW |
| 1021 | 06C7 | 644808 | | ONI | PA,08H ;CHECK TEST CKT |
| 1022 | 06CA | 4FC0 | | GJMP | START ;LOOP IF NOT USED |
| 1023 | 06CC | 305C | | DCRW | TIM13 |
| 1024 | 06CE | 4FBC | | GJMP | START |
| 1025 | 06D0 | 715C20 | | MVIW | TIM13,20H ;RESET COUNTER |
| 1026 | 06D3 | BA | | DI | |
| 1027 | 06D4 | 0108 | | LDAW | ITOTH ;STORE I TOTALS |
| 1028 | 06D6 | 6337 | | STAW | TITOTH |
| 1029 | 06D8 | 0107 | | LDAW | ITOTM |
| 1030 | 06DA | 6336 | | STAW | TITOTM |
| 1031 | 06DC | 0106 | | LDAW | ITOTL |
| 1032 | 06DE | 6335 | | STAW | TITOTL |
| 1033 | 06E0 | 6408DF | | ANI | PA,0DFH ;START TEST CYCLE |
| 1034 | 06E3 | 4FA7 | | GJMP | START |
| 1035 | 06E5 | 400201 | STAR4: | CALL | DLYSUB ;WAIT 20 MSEC |
| 1036 | 06E8 | 3055 | | DCRW | TIM06 ;DEC TEST TIMER |
| 1037 | 06EA | 4FA0 | | GJMP | START ;JMP IF NOT TIMED OUT |
| 1038 | 06EC | 6418C0 | | ORI | PA,0C0H ;SET MUX ADDRESS |
| 1039 | 06EF | 641D40 | | ORI | PF,040H ;TURNON TRIP LED |
| 1040 | 06F2 | 05007F | | ANIW | STIND1,07FH ;RESET SETUP BIT |
| 1041 | 06F5 | 715527 | | MVIW | TIM06,27H |
| 1042 | 06F8 | AA | STAR5: | EI | |
| 1043 | 06F9 | 640DF7 | | ANI | PF,0F7H ;TRIP RELAY |
| 1044 | 06FC | 645810 | | OFFI | PA,010H ;TEST RESET SWITCH |
| 1045 | 06FF | F8 | | GJMP | STAR5 |
| 1046 | 0700 | BA | | DI | |
| 1047 | 0701 | 150080 | | ORIW | STIND1,080H ;SET SETUP BIT |
| 1048 | 0704 | 64083F | | ANI | PA,03FH ;RESET MUX ADDRESS |
| 1049 | 0707 | 640DDF | | ANI | PF,0DFH ;TURNOFF TRIP LED |
| 1050 | 070A | 641D08 | | ORI | PF,08H ;RESET RELAY |
| 1051 | 070D | 715580 | | MVIW | TIM06,80H |
| 1052 | 0710 | AA | | EI | |
| 1053 | 0711 | 4F79 | | GJMP | START |
| 1054 | 0713 | 150218 | STAR6: | ORIW | TMFLAG,18H ;RESET ACCEL BIT |
| 1055 | 0716 | 641D40 | | ORI | PF,040H ;TURNON TRIP LED |
| 1056 | 0719 | 4F71 | | GJMP | START ;LOOP |
| 1057 | | | | END | |

While certain features and embodiments of the invention have been described herein, it will be understood that the invention encompasses all modifications and enhancements within the scope and spirit of the following claims.

What is claimed is:

1. A solid-state digital overload control circuit for monitoring the load conditions on a three-phase motor having three phases to detect the presence of a predetermined overload condition and to respond thereto to shut down the power supply to the motor, the overload control circuit comprising:
    a. monitoring means coupled to each of the three phases of the motor for reading the distinct load condition on each said phase and for generating three distinct, representative single-phase load signals;
    b. a reference signal generator for generating a distinctive reference signal;
    c. output means for receiving and continuously, sequentially scanning said three load signals and said reference signal and generating therefrom a single combined load signal which distinctly defines and corresponds to each of the three load signals and the reference signal; and
    d. control means for receiving said combined load signal and responsive thereto for shutting down the power supply to said motor when a predetermined overload condition is present.

2. The overload control circuit of claim 1, the monitoring means further comprising:
    a. three current transformers, one each associated with each phase of the motor; and
    b. three converters, one each coupled to one each of said current transformers, each said converter producing a direct current signal representative of the load on the associated phase of the motor.

3. The overload control circuit of claim 1, the output means further comprising a multiplexer adapted for receiving and continuously sequentially scanning the three single-phase load signals and the reference signal and for producing therefrom a combined low signal representative of the load on each of the three phases of said motor.

4. The overload control circuit of claim 1, the control means comprising:
    a. a programmable circuit for receiving said combined load signal and comparing it with programmed conditions to determine the presence of an overload condition and for producing an overload trip signal in response thereto; and
    b. a relay circuit in association with said programmable circuit for receiving said trip signal and responsive thereto to shut down the power supply to said motor.

5. The overload control circuit of claim 4, further including an adjustable trip delay circuit in association with said programmable circuit for providing an adjustable time delay between the onset of an overload condition and the production of said overload trip signal.

6. The overload control circuit of claim 5, said trip delay circuit including ports for attaching an external meter device thereto for reading and calibrating the trip signal time delay.

7. The overload control circuit of claim 4, said programmable circuit further producing a reset signal for indicating when the presence of an overload condition has been terminated and the power supply to the motor can be resumed.

8. The overload control circuit of claim 7, further comprising an adjustable reset time delay circuit for providing a predetermined time delay between the termination of the reset signal and the production of said reset signal.

9. The overload control circuit of claim 8, further comprising means for calculating the reset signal time delay in response to predetermined conditions being present at the onset of a trip condition.

10. The overload control circuit of claim 9, said means for calculating the reset signal time delay adapted for responding to the level of an overload condition and the timing of said overload to shorten the programmed reset signal time delay.

11. The overload control circuit of claim 8, further comprising a programmable circuit fault detector adapted for monitoring the operating mode of said motor as represented by the combined load signal and responsive to said load signal and to an unrelated fault condition in the programmable circuit to override the trip delay time when the fault has occurred absent the presence of an overload condition.

12. The overload circuit of claim 8, further comprising means for automatically resetting the circuit in response to the production of said reset signal.

13. The overload circuit of claim 4, further comprising:
    a. a programmable memory associated with said programmable circuit for storing and communicating to said programmable circuit overload parameter definitions for a specific motor; and
    b. an interface associated with said memory for coupling said memory to an off-site computer, whereby said memory can be programmed.

14. The overload control circuit of claim 4, the programmable circuit further comprising means for resetting the trip delay in response to motor conditions present when an overload condition is first detected.

15. The overload control circuit of claim 1, further including an adjustable gain amplifier inserted between said output means and said control means for receiving and selectively adjusting the gain on said combined load signal.

16. The overload control circuit of claim 15, the adjustable amplifier including ports for attaching an external meter device thereto for reading and calibrating said gain adjustment.

17. The overload control circuit of claim 1, further including means for providing a readout of the operating mode of the motor as represented by the combined load signal.

18. The overload control circuit of claim 17, said readout means further comprising:
    a. means for providing a first signal when said motor is in a normal operating mode;
    b. means for providing a second signal when the onset of an overload condition has been detected in said motor;
    c. means for providing a third signal when the power supply to the motor has been shut down in response to the presence of the overload condition; and
    d. means for providing a fourth signal when the overload condition has been terminated.

19. A solid-state digital overload control circuit for monitoring the load condition of a three-phase motor having three phases to detect the presence of a predetermined overload condition and to respond thereto to shut down the power supply to the motor, comprising:
  a. three current transformers, one each associated with each phase of the motor;
  b. three signal converters, one each coupled to one each of said current transformers, each said converter producing a direct current load signal representative of the load on the associated phase of the motor;
  c. means for generating a reference signal;
  d. a multiplexer adapted for receiving and continuously, sequentially scanning the three direct current load signals and the reference signal and for producing therefrom a combined load signal representative of the load on each of the three phases of the motor and the reference signal;
  e. a programmable circuit for receiving said combined load signal and comparing it with programmed conditions to determine the presence of an overload condition and for producing on overload signal in response thereto;
  f. a relay circuit in association with said programmable circuit for receiving said trip signal and responsive thereto to shut down the power supply to said motor;
  g. an adjustable gain amplifier means inserted between said programmable circuit and said multiplexer for receiving and selectively adjusting the gain on said combined load signal, the adjustable gain amplifier means having ports for attaching an external meter device thereto for reading and calibrating said gain adjustment; and
  h. an adjustable trip delay circuit in association with said programmable circuit for providing an adjustable time delay between the onset of an overload condition and the production of said overload trip signal, said adjustment trip delay circuit having ports for attaching an external meter device thereto for reading and calibrating the trip signal time delay.

20. The overload control circuit of claim 19, said programmable circuit further producing a reset signal for indicating when the presence of an overload condition has been terminated and the power supply to the motor can be resumed, the circuit further comprising an adjustable reset time delay circuit for providing a predetermined time delay between the termination of the reset signal and the production of said reset signal.

21. The overload circuit of claim 19, further including:
  a. means for providing a first signal when said motor is in a normal operating mode;
  b. means for providing a second signal when the onset of an overload condition has been detected in said motor;
  c. means for providing a third signal when the power supply to the motor has been shut down in response to the presence of the overload condition; and
  d. means for providing a fourth signal when the overload condition has been terminated.

22. A solid-state digital overload control circuit for monitoring the load conditions on a three-phase motor having three phases to detect the presence of a predetermined overload condition and to respond thereto to open the circuit between a power supply and the motor, the overload control circuit comprising:
  a. three internal current transformers, one each associated with each phase of the motor;
  b. three converters, one each coupled to one each of said current transformers, each said converter producing a direct current rms signal representative of the load on the associated phase of the motor;
  c. means for generating a reference signal;
  d. a multiplexer adapted for receiving and continuously sequentially scanning the three direct rms current signal and the reference signal and for producing therefrom a combined digital load signal representative of the load on each of the three phases of the motor;
  e. a microprocessor for receiving said combined load signal and comparing it with programmed conditions to determine the presence of an overload condition and for producing an overload trip signal and response thereto;
  f. a relay circuit in association with said microprocessor and coupled intermediate of the power supply and motor for receiving said trip signal and in response thereto to open the circuit between the power supply and said motor;
  g. an adjustable gain amplifier between the multiplexer and the microprocessor for receiving and selectively adjusting the gain on said combined load signal;
  h. ports associated with said adjustable gain amplifier for attaching an external meter device thereto for reading and calibrating said gain adjustment;
  i. an adjustable trip delay circuit in association with said microprocessor for providing an adjustable time delay between the onset of an overload condition and the production of the overload trip signal;
  j. ports associated with said trip delay circuit for attaching an external meter device thereto for reading and calibrating the trip signal time delay; and
  k. means for providing a first signal when said motor is in normal operating mode, a second signal when the onset of an overload condition has been detected in said motor, a third signal when the circuit between said power supply and said motor has been opened in response to the presence of an overload condition, and a fourth signal when the overload condition has been terminated.

23. A method of monitoring the load conditions present on a three-phase motor having three phases for detecting the presence of a predetermined overload condition and for responding to the overload condition to shut down the power supply to the motor the method comprising the steps of:
  a. generating a reference signal;
  b. continuously, sequentially scanning the reference signal and the load present on each of the three phases of the motor;
  c. developing a combined load signal from the three loads and the reference signal which distinctly defines and corresponds to the three loads and the reference signal;
  d. determining the presence of an overload condition from the combined load signal; and e. shutting down the power supply to the motor in response to the presence of the overload condition.

24. The method of claim 23, further comprising the step of delaying for a predetermined time period the shutting down of the power supply to the motor in the presence of the overload condition.

25. The method of claim 24, including the step of adjusting the time delay in accordance with operating parameters of the particular motor being monitored.

26. The method of claim 23, further comprising the step of resupplying the power supply to the motor once the overload condition has been terminated.

27. The method of claim 26, including the step of delaying for a predetermined time period the resupply of the power supply once the overload condition is terminated.

28. The method of claim 27, including the step of adjusting the resupply time delay in accordance with operating parameters of the particular motor being monitored.

29. The method of claim 23, including the steps of:
   a. signaling when an overload condition is not present;
   b. signaling the onset of an overload condition; and
   c. signaling when the power supply has been shut down; and
   d. signaling when the power supply may be resupplied to the motor after termination of the overload condition.

30. A method of monitoring the load conditions present on a three-phase motor having three phases for detecting the presence of a predetermined overload condition and for responding to the overload condition to shut down the power supply to the motor, the method comprising the steps of:
   a. generating a reference signal;
   b. continuously, sequentially scanning the reference signal and the load present on each of the three phases of the motor;
   c. developing a combined load signal from the three loads and the reference signal;
   d. determining the presence of an overload condition from the combined load signal;
   e. shutting down the power supply to the motor in response to the presence of the overload condition after a predetermined delay; and
   f. resupplying the power supply to the motor after a predetermined time delay once the overload condition has been terminated.

31. The method of claim 30, wherein the time delays of steps (e) and (f) are adjustable.

32. The method of claim 30, further including the steps of:
   a. signaling when an overload condition is not present;
   b. signaling the onset of an overload condition;
   c. signaling when the power supply has been shut down; and
   d. signaling when the power supply may be resupplied to the motor after termination of the overload condition.

* * * * *